US 6,404,538 B1

(12) United States Patent
Chen et al.

(10) Patent No.: US 6,404,538 B1
(45) Date of Patent: *Jun. 11, 2002

(54) HIGH-SPEED ELECTRO-OPTIC MODULATOR

(75) Inventors: Qiushui Chen, Medford, MA (US); Gary Y. Wang, Fremont, CA (US); Paul Melman, Newton, MA (US); Kevin Zou, Burlington, MA (US); Hua Jiang, Mansfield, MA (US); Run Zhang, Bedford, MA (US); Jing Zhao, Winchester, MA (US); Dean Tsang, Burlington, MA (US); Feiling Wang, Medford, MA (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,538

(22) Filed: Oct. 24, 2000

Related U.S. Application Data

(63) Continuation of application No. 09/288,439, filed on Apr. 8, 1999, now Pat. No. 6,330,097, which is a continuation-in-part of application No. 09/158,224, filed on Sep. 22, 1998, now Pat. No. 6,137,619.
(60) Provisional application No. 60/081,011, filed on Apr. 8, 1998, and provisional application No. 60/117,386, filed on Jan. 27, 1999.

(51) Int. Cl.⁷ .............................. G02F 1/00; G02F 1/01; G02F 1/07
(52) U.S. Cl. ...................... 359/323; 359/239; 359/251; 359/322
(58) Field of Search ................................ 359/245, 246, 359/256, 251, 252, 254, 255, 322, 323, 239; 385/8

(56) References Cited

U.S. PATENT DOCUMENTS

| 3,663,088 A | 5/1972 | Maldonado et al. ........ 359/252 |
| 3,684,350 A | 8/1972 | Wentz .......................... 359/256 |
| 3,719,414 A | 3/1973 | Wentz .......................... 359/247 |

(List continued on next page.)

FOREIGN PATENT DOCUMENTS

| EP | 0 054 411 | 6/1982 | |
| JP | 54-79060 | 6/1979 | |
| JP | 08076071 | 3/1996 | |
| WO | WO 99/67679 A2 * | 12/1999 | ............. G02F/1/00 |

Primary Examiner—Georgia Epps
Assistant Examiner—David N. Spector
(74) Attorney, Agent, or Firm—Hamilton, Brook, Smith & Reynolds, P.C.

(57) ABSTRACT

An optical modulator is provided to control the intensity of a transmitted or reflected light. In a transmission mode, a separator splits arbitrarily polarized light into two polarization rays and one is made to travel a separate path from the other. A recombiner causes the two rays to recombine at an output unless an electro-optic phase retarder changes the polarization of the two rays, in which case, both of them miss the output by an amount which is a function of the voltage on the retarder. A normally-off version with low polarization mode dispersion is obtained by changing the orientation of the recombiner. A normally-on version with low polarization mode dispersion is obtained with a passive polarization direction rotator. Similar results can be obtained in a reflection mode where the input and output are on the same side of the modulator. Versions using a GRIN lens are particularly suited to modulation of light out of and back into fiber-optic cables. The device can be operated as a variable optical attenuator, an optical switch, or a high speed modulator and is insensitive to polarization of the input light. A preferred material for the phase retarder is a hot-pressed ceramic lead lanthanum zirconate titanate composition.

37 Claims, 23 Drawing Sheets

U.S. PATENT DOCUMENTS

| | | | |
|---|---|---|---|
| 4,201,450 A | 5/1980 | Trapani | 359/254 |
| 4,410,238 A | 10/1983 | Hanson | 349/196 |
| 4,548,478 A | 10/1985 | Shiraskai | 359/256 |
| 4,572,619 A | 2/1986 | Reininger et al. | 359/254 |
| 4,636,786 A | 1/1987 | Haertling | 345/84 |
| 4,746,191 A | 5/1988 | Kawakami et al. | 385/16 |
| 5,029,989 A | 7/1991 | Phillips | 359/276 |
| 5,090,824 A | 2/1992 | Nelson et al. | 385/22 |
| 5,276,747 A | 1/1994 | Pan | 385/34 |
| 5,400,417 A | 3/1995 | Allie et al. | 385/2 |
| 5,727,109 A | 3/1998 | Pan et al. | 385/140 |
| 5,963,357 A | 10/1999 | Kubota et al. | 359/209 |
| 6,137,619 A | 10/2000 | Chen et al. | 359/251 |

* cited by examiner

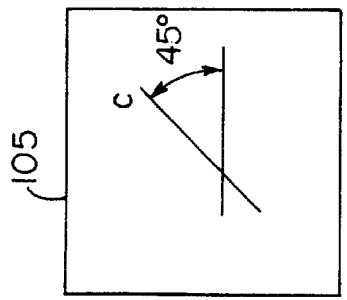
Fig. 3B
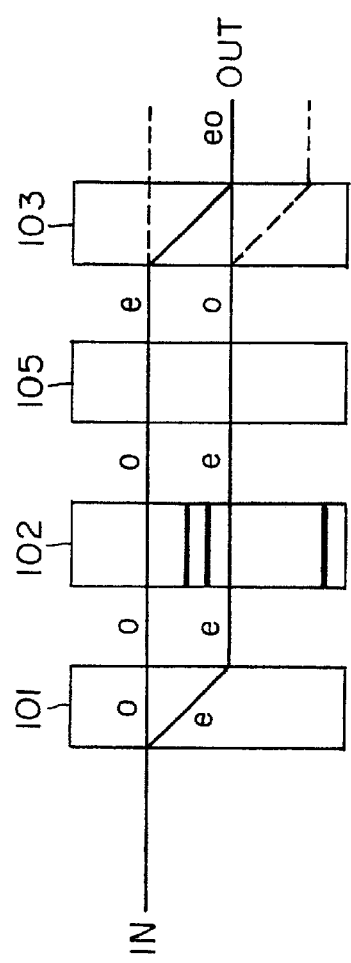
Fig. 3A
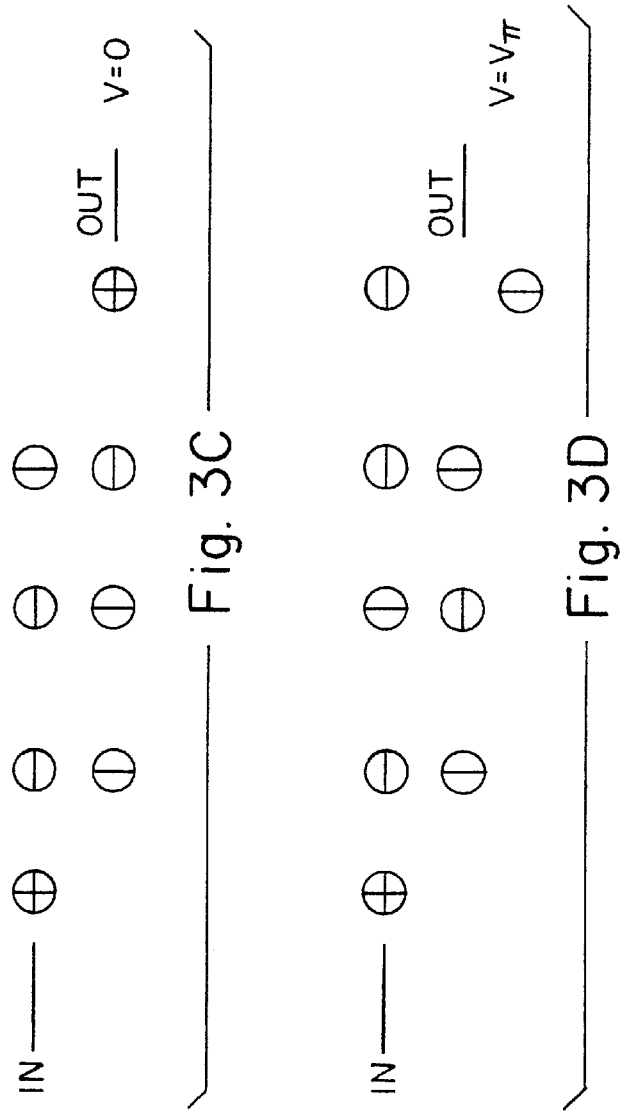
Fig. 3C
Fig. 3D

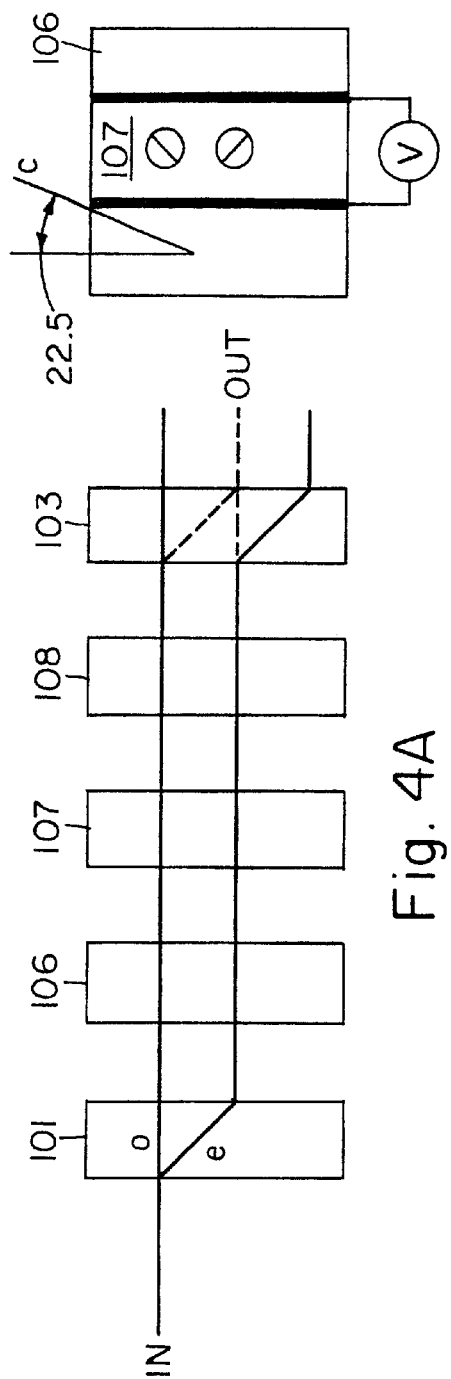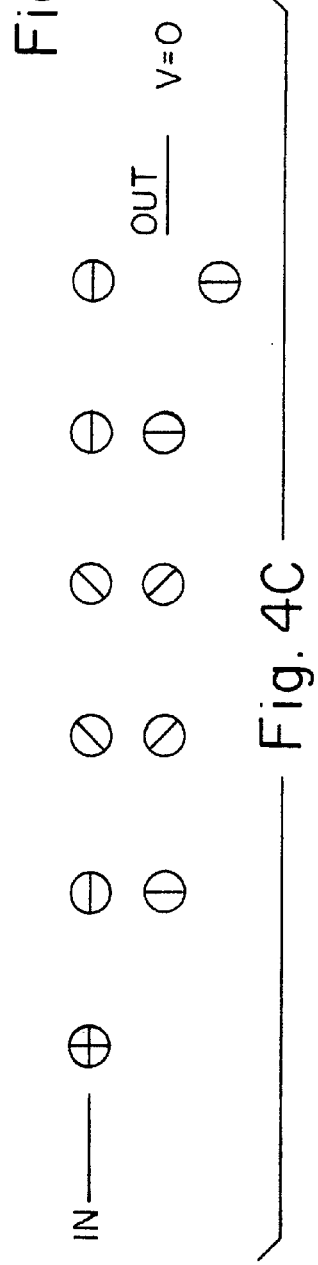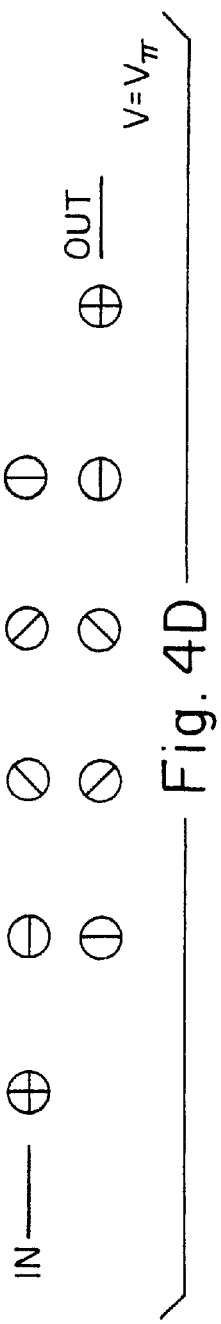

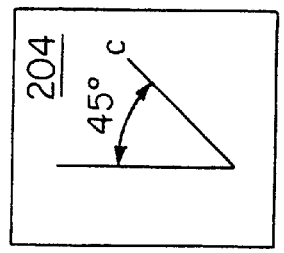
Fig. 7B
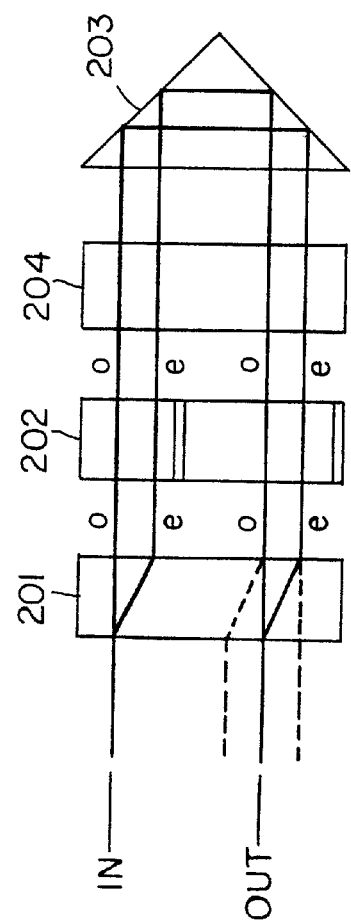
Fig. 7A
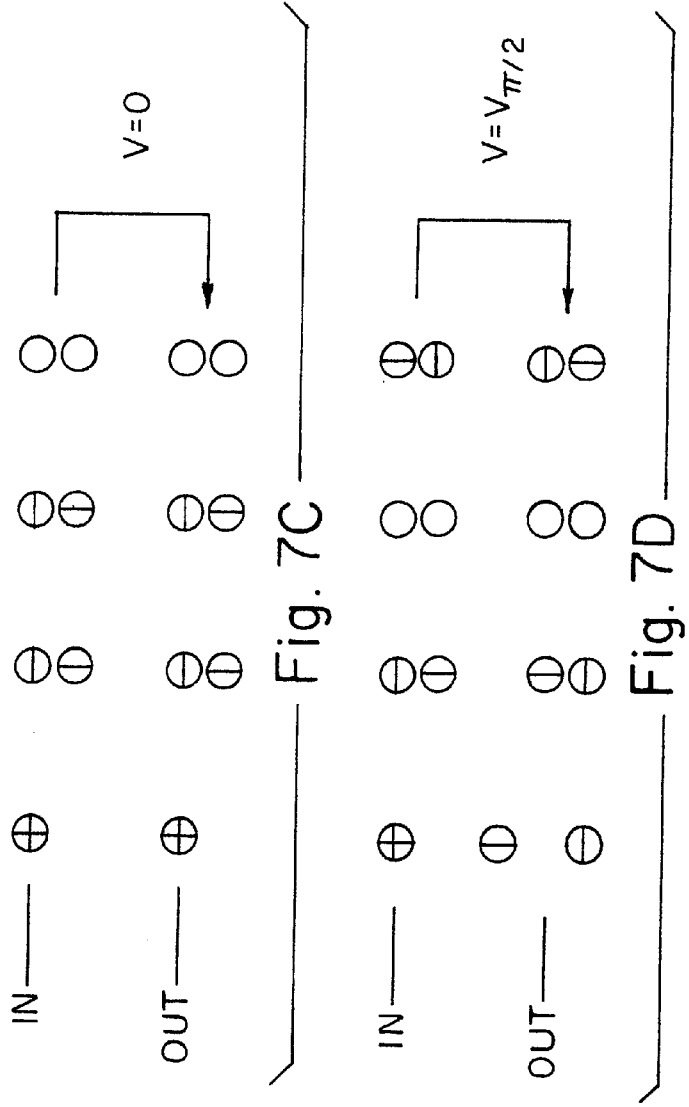
Fig. 7C
Fig. 7D

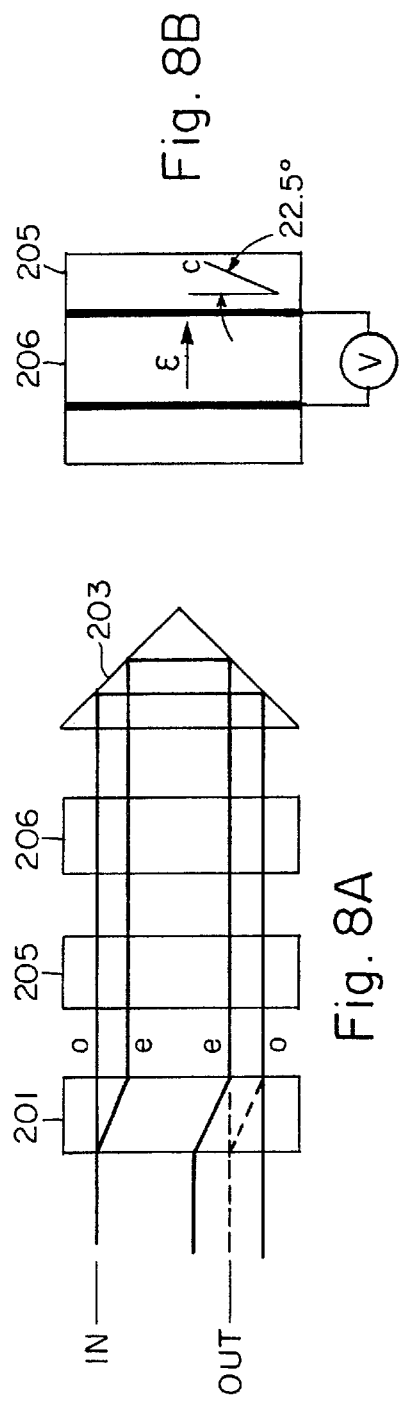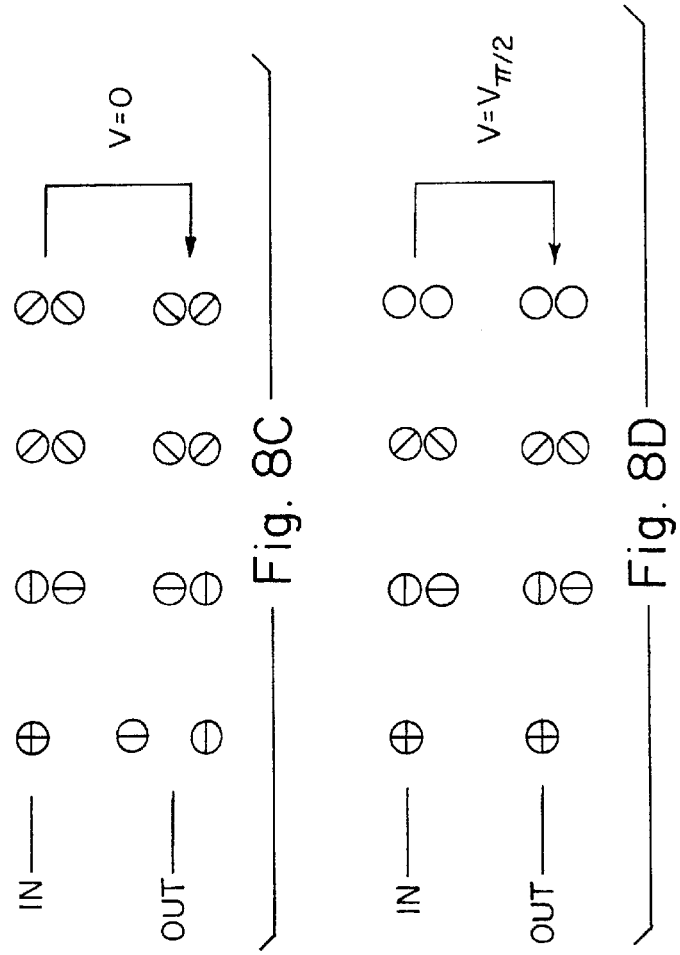

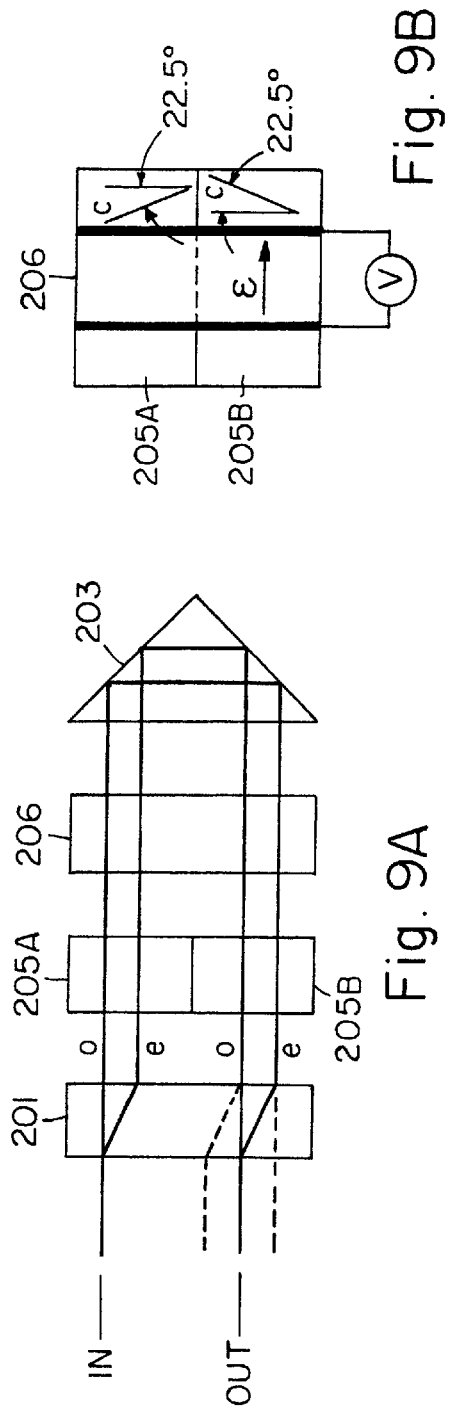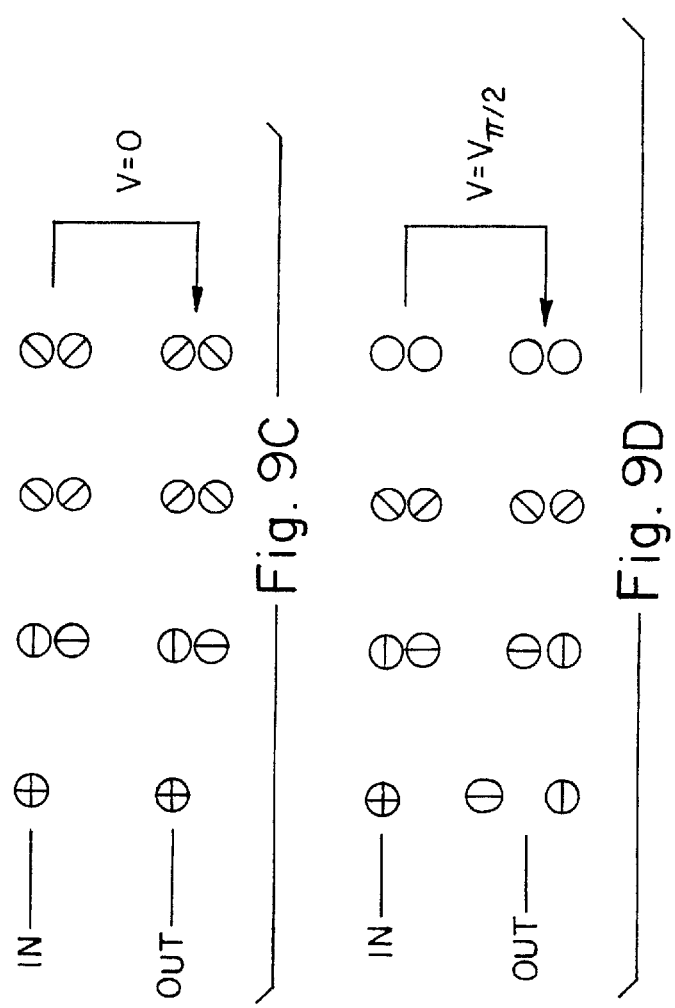
Fig. 9A
Fig. 9B
Fig. 9C
Fig. 9D

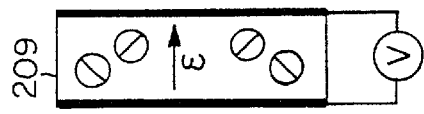
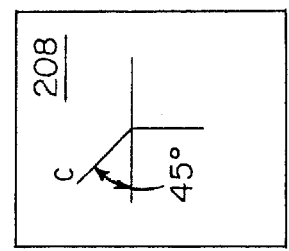
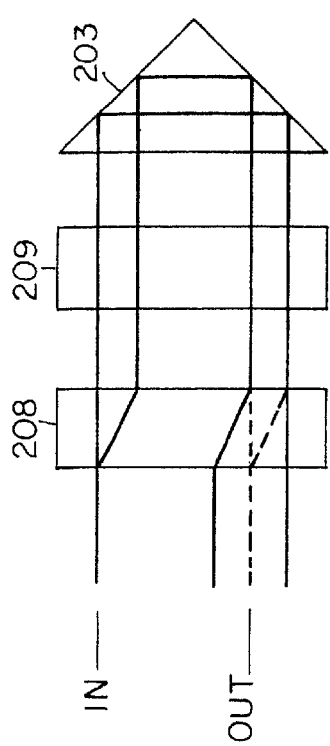
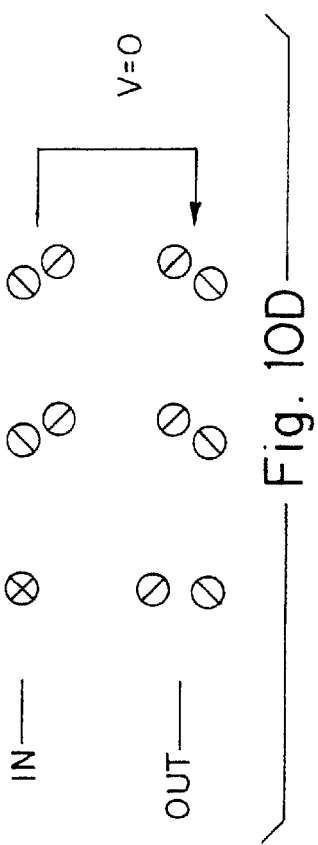
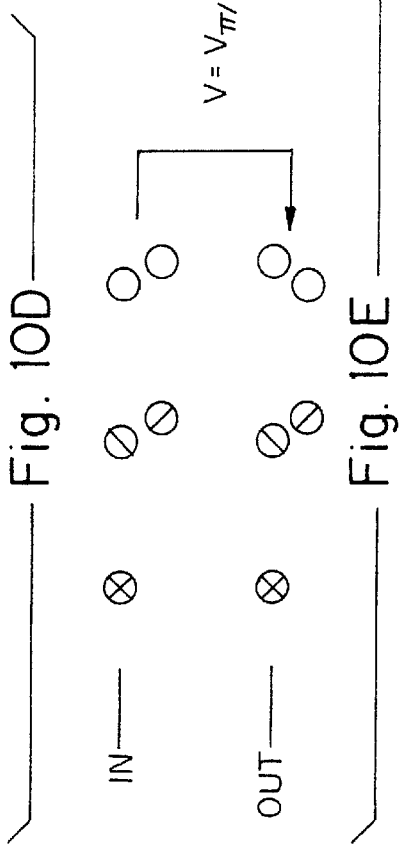

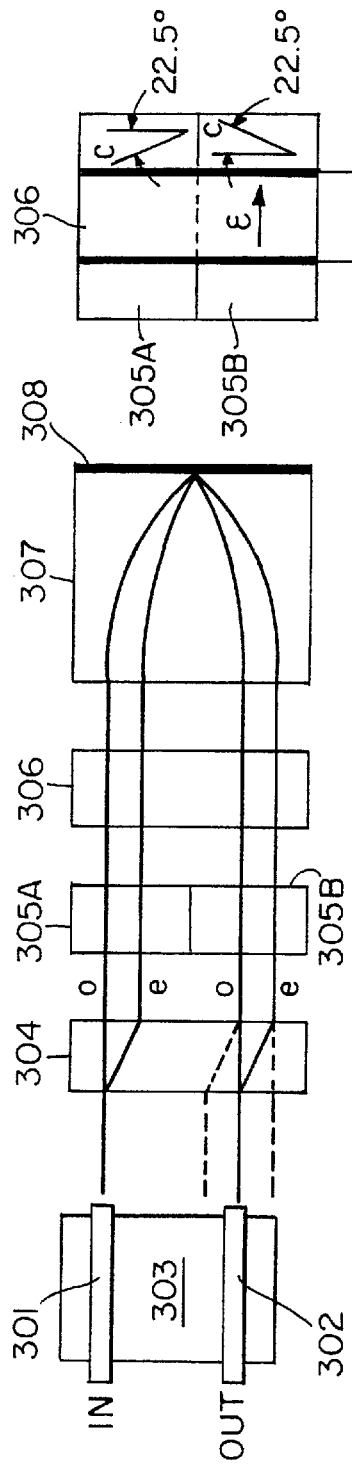
Fig. 11A
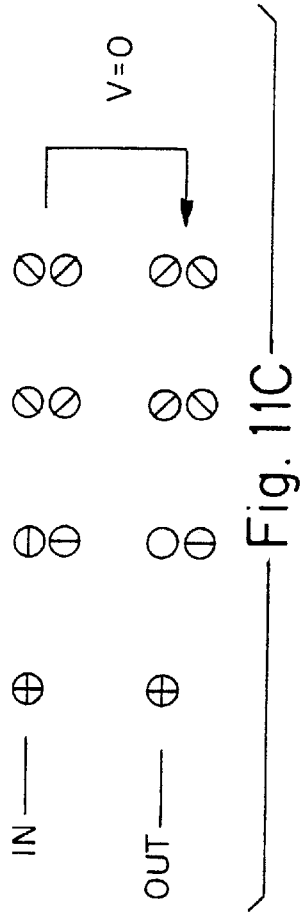
Fig. 11B
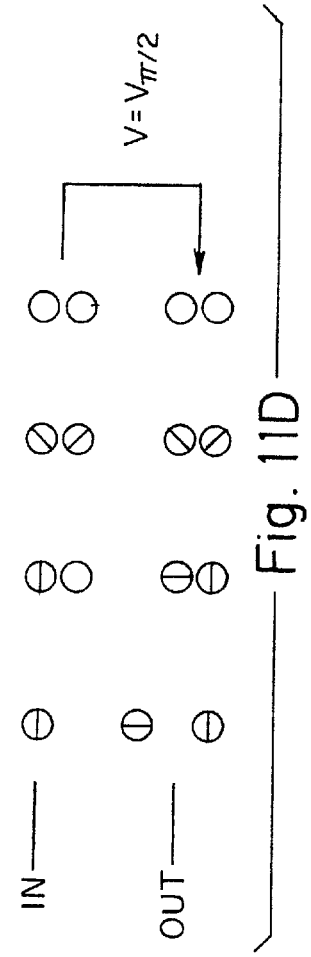
Fig. 11C
Fig. 11D

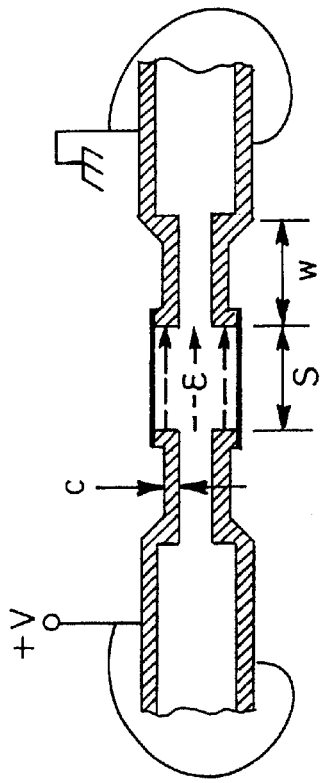
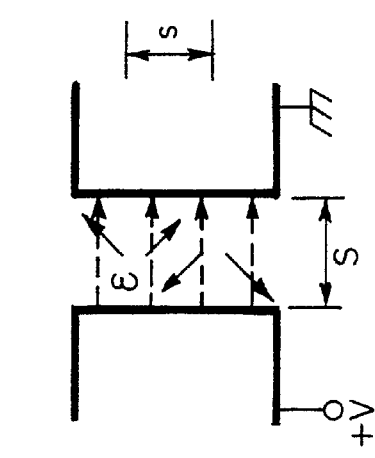
Fig. 12B
Fig. 12A
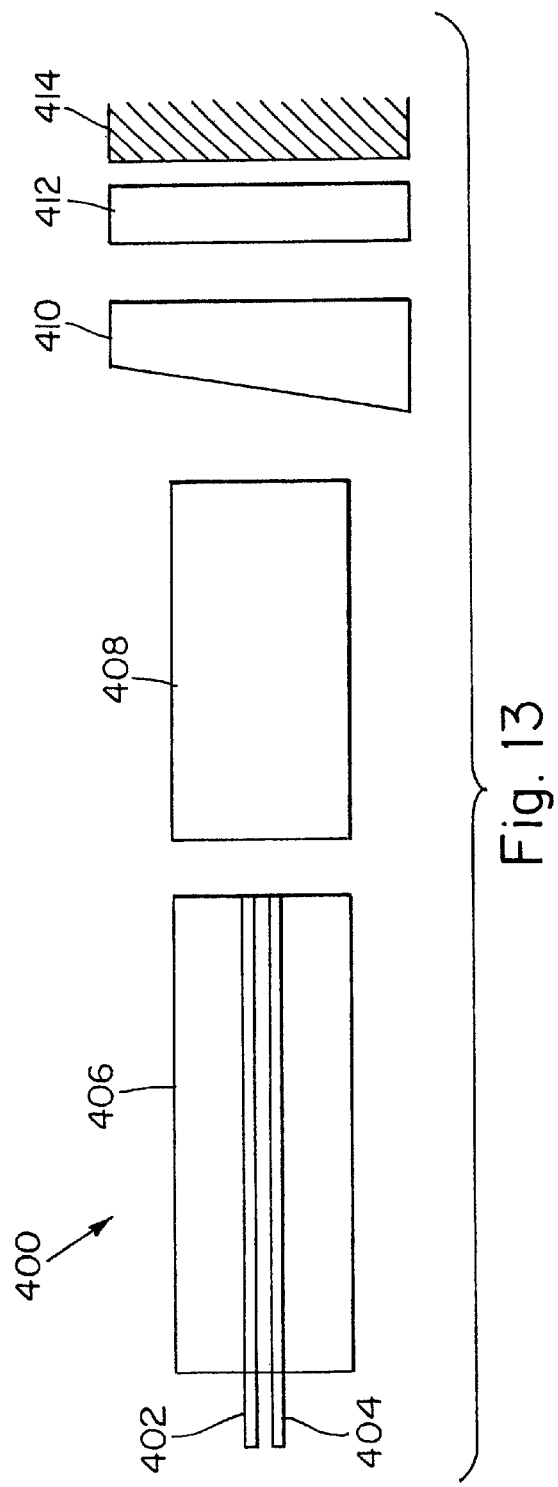
Fig. 13

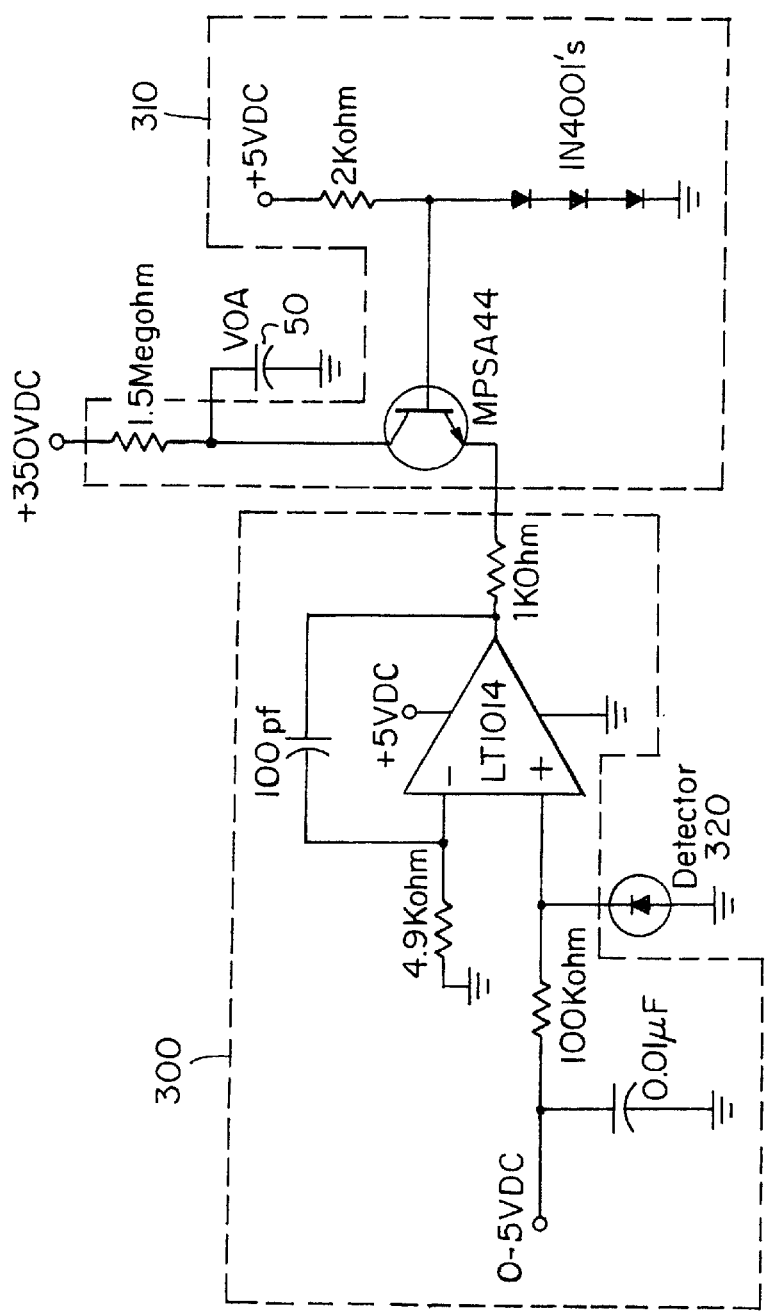
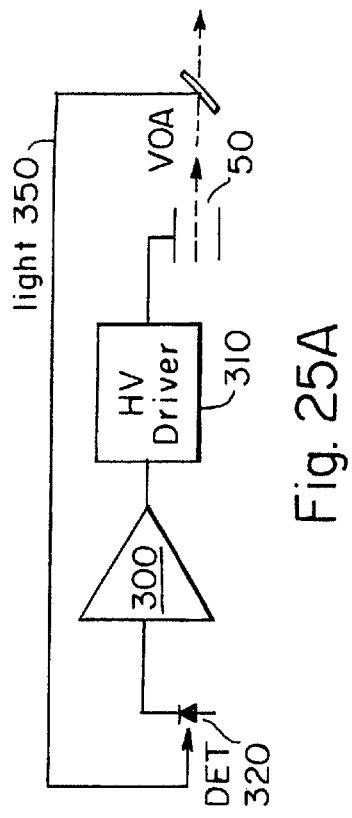
Fig. 25A
Fig. 25B

HIGH-SPEED ELECTRO-OPTIC MODULATOR

RELATED APPLICATIONS

This application is a continuation of U.S. application Ser. No. 09/288,439, filed Apr. 8, 1999, now U.S. Pat. No. 6,330,097 which is a continuation-in-part of U.S. application Ser. No. 09/158,224 filed Sep. 22, 1998, (now U.S. Pat. No. 6,137,619, issued on Oct. 24, 2000), which claims priority to U.S. Provisional Application No. 60/081,011, filed Apr. 8, 1998, and in addition, claims priority to U.S. Provisional Application No. 60/117,386, filed Jan. 27, 1999, the entire contents of all the above applications being incorporated herein by reference.

BACKGROUND OF THE INVENTION

Much progress has been made in the last thirty years in developing optical switches or modulators, but current devices are not very satisfactory for many applications. The majority of active fiberoptic devices used in present day systems, for example, fiberoptic intensity attenuators, are based on electromechanical operation. In one type, fibers are positioned end to end and mechanically moved in or out of line. In another type, mirrors are rotated to direct beams into or away from a receiving fiber. This can be accomplished mechanically or with piezoelectric or electrostatic drivers. Mechanical devices intrinsically lack speed and long term reliability. Solid-state light controlling devices (without moving parts) are needed for fiber communication systems. A key problem for these developing fiberoptic components is realizing speed and reliability, as well as the essential fiberoptic systems requirement of low insertion loss and polarization insensitivity. For devices used between regular fibers, low insertion loss and polarization insensitivity operation is the basic performance requirement.

Others have proposed an optical switch/attenuator using a liquid crystal cell as the modulation element situated between an input and an output birefringent element, each fed by optical fibers. When the liquid crystal cell is turned on, light emerging from the output birefringent element is deflected and not focused by the subsequent collimator onto the corresponding optical fiber. Although it has the desirable features of low insertion loss, and low required operating voltage, being liquid crystal-based, the long term reliability of organic materials and the relatively low switching speed are not suitable for many applications.

Others have also proposed a fast (less than one microsecond) optical switch using an electro-optic crystal in which birefringence can be induced by application of an electric field. Operation is based on rotating the plane of polarization of light with respect to the orientation of a subsequent passive polarizer that blocks or transmits light depending on the angle. The basic arrangement works efficiently with incoming light polarized with a particular orientation. Randomly polarized light suffers a loss. This is overcome by using additional elements that split incoming light into two orthogonal polarizations, passively rotates one to match the other, and combines the two into a single beam fed to the basic modulator. However, the suggested electro-optic crystals, require voltages of a kV or more for operation.

Still others have described a modulator having a tapered plate, a Faraday rotator or electro-optic crystal, and a second tapered plate. The Faraday rotator is controlled by varying the current in an external coil which varies a magnetic field. The suggested electro-optic crystals require high drive voltages of kilovolts. Electrode design also effects polarization dependence and modulation efficiency.

SUMMARY OF THE INVENTION

Accordingly, the main objects of the invention are to provide an electrically controllable solid state optical modulator, attenuator, or switch that is insensitive to the polarization of the incoming light, has low insertion loss and, has a fast (one hundred nanoseconds or less) response time. Another object of the present invention is to provide a system for compensating the solid state devices against environmental changes, for example, temperature. Additional objects are to provide a device using rugged oxide materials and using easy assembly and alignment processes.

These objectives and other features and advantages are realized in two basic modes. In the transmission mode, arbitrarily polarized light beam enters from one side (the input surface) and exits the other side (the output surface). In one embodiment, the modulator comprises, between the input and output, a polarization separator, e.g., a birefringent plate with an oriented c-axis, followed by an electro-optic phase retarder with electrodes to generate an internal electric field when a voltage is applied, followed by a polarization recombiner. The separator breaks the light beam into two polarization rays, an ordinary one having a polarization direction (angular orientation with respect to the separator c-axis) perpendicular to the c-axis and an extraordinary one with a polarization direction parallel to the c-axis. In addition, the extraordinary ray is deflected in a plane containing the c-axis while the ordinary ray travels straight through. These two paths define a separation plane. The recombiner doesn't effect ordinary rays either, but causes extraordinary rays to be deflected an equal amount but opposite the separator deflection back to be recombined with undeflected ordinary rays at the output. The modulator is normally-on. The phase retarder has an electric field that extends across the optical path at an angle, preferably at about 45° to the separation plane which is also at 45° to both the extraordinary and ordinary polarization directions. When a voltage is applied to the phase retarder, portions of the extraordinary ray become ordinary and are not deflected to the output. In addition, portions of the ordinary ray become extraordinary and, instead of traveling through the recombiner to the output are deflected away from it. With sufficient voltage, the two rays are completely interchanged so that none of their components reach the output.

A normally-off modulator can be obtained simply by orienting the deflection of the recombiner to be in the same direction as the separator. If the output is placed equidistant between the undeflected ordinary ray and the twice deflected extraordinary ray, none will normally reach the output. However, if a voltage is applied to the phase retarder, portions of the ordinary ray will be deflected once and portions of the extraordinary ray will be not be deflected and both will reach the output. With sufficient voltage, all light will reach the output. Addition of a 90° polarization direction rotator, i.e., a polarization direction interchanger, to the normally-off modulator produces a normally-on modulator with low polarization mode dispersion. Addition of two 45° polarization direction rotators allows the fields in the phase retarder to be at 90° to the separation plane which produces a modulator with the minimum spacing between phase retarder electrodes thereby reducing the control voltage.

In a reflection mode, the simplest version comprises a separator covering an input area and a transversely displaced recombiner covering an output area, both followed by an electro-optic phase retarder, in turn followed by a reflector which directs the rays which have traveled through the separator and retarder back through the retarder for a second pass and then through the recombiner to the output. Having the input and output on the same side is considered useful in certain applications. A further advantage is that having two passes through the phase retarder means that each pass adds to the phase so that less voltage is required for full modulation. In full modulation, linear polarized extraordinary and ordinary rays with polarization directions at 45° to the electric field become circularly polarized on one pass and rotated by 90°, i.e., interchanged, after two passes.

As in the transmission mode, the deflection of the recombiner can be arranged to provide normally-on or normally-off modulation. The control voltage can be reduced by adding a 45° polarization direction rotator, e.g., a half-wave plate with a c-axis at 22.5°+N×45° (N an integer), between the separator/recombiner and the phase retarder so that the electric field can be at 90° to the separation plane. Insertion of a circular polarizer, e.g., a quarter-wave plate with a c-axis at 22.5°+N×45° (N an integer) will convert any configuration from normally-on to normally-off and vice versa.

The described modulator/attenuator can be built advantageously to control power levels in, for example, fiberoptic communication systems. In these applications the I/O ports are made of optical fibers and can be assembled in transmission or in reflection mode. In particular, the transmission and reflection mode assemblies can be made advantageously using Graded Index lenses (GRIN lenses). For a reflective system, one side of the lens can be made reflective by e.g. coating the lens surface or attaching a mirror. The other side of the lens receives the input light and emits the output beam. The two input/output fibers must be symmetrically located on both sides of the optical axis of the GRIN lens. For ease of alignment the fibers can be mounted on a single fiber block and aligned simultaneously to the optimal position. This type of alignment eliminates a full degree of freedom and makes the fiber attachment considerably more expedient.

The phase retarder can be made from a special class of ferroelectric complex oxides in the form of polycrystalline ceramics which are optically isotropic, but become anisotropic along the direction of an applied electric field. In other words, the field makes them birefringent with a higher index of refraction along the field than perpendicular to it. An example is lead lanthanum zirconate titanate (PLZT). The electric fields for full modulation are higher than for liquid crystal phase retarders, but the response time is much faster.

According to another aspect of the invention, a system to provide transmission as a function of control voltage without hysteresis, comprises a compensator for an electro-optic device that can be characterized as having an optical input port, an optical output port, and an electrical control port connected to an electro-optic phase retarder that controls optical transmission through the device.

In one such embodiment, there is provided a stable light source having a selected amplitude directed toward a second reference attenuator comprising a first polarizer, a second electro-optic phase-retarder that can be constructed from the same material as the first phase retarder in the main optical attenuator, and a second polarizer aligned with respect to the first polarizer to function as an analyzer. In addition, a light sensor detects the output from the analyzer and applies a voltage to the inverting input of an amplifier. The amplifier output is connected to the second phase retarder forming an electro-optic feedback loop and also to the first phase retarder in the electro-optic device. When a voltage is connected to the non-inverting input of the amplifier, it produces an optical amplitude at the light sensor with a desired attenuation of the light from the stable light source that is environmentally stable. If the electro-optic device is calibrated against the reference attenuator, the matched phase retarders produce an environmentally stable electro-optic device. In particular, if the electro-optic device is an attenuator, its transmission is controlled by the input voltage to the reference. Further, if the phase retarder material is a ferroelectric with hysteresis, those effects will be mitigated. This embodiment can be used to control an electro-mechanical (piezoelectric) actuator if the actuator is substituted for the electro-optic device provided the movement of the actuator is calibrated against attenuation in the reference attenuator.

In another embodiment of the present invention, additional apparatus comprises a first beam splitter for deflecting a portion of the beam directed to the input port, a first light sensor for measuring the amplitude of the deflected portion the input beam, a controllable electrical attenuator for attenuating the output of the first light sensor, a second beam splitter for deflecting a portion of the beam directed to the output port, a second light sensor for measuring the amplitude of the deflected portion of the output beam, and an amplifier for amplifying the difference between the output of the electrical attenuator and the second light sensor. The amplifier output is connected to the control port of the optical attenuator forming a feedback loop so that the output of the optical attenuator is controlled by the setting of the electrical attenuator.

The same approach may be used to control absolute transmission by providing a beam splitter on the output port and a stable light sensor and amplifying the difference with respect to an input signal.

According to another embodiment of the present invention, for use with ferroelectric devices, especially having hysteresis, there is provided a capacitor having a selected value connected to one side of the electrical control port and the inverting input of an amplifier with its output connected to the other side of the electrical control port so that a feedback loop is formed. When a voltage is applied to the non-inverting input of the amplifier, the effect of the capacitor and feedback loop is to produce a controllable charge on the electro-optic material that remains relatively constant with environmental changes.

The above and other features and advantages of the invention, including various novel details of construction and combination of parts, will now be more particularly described with reference to the accompanying drawings and pointed out in the claims. It will be understood that the particular system and methods embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

FIGS. 3A–3D show an embodiment which is normally-on when no voltage is applied and has low polarization mode dispersion.

FIGS. 4A–4D show an embodiment which is normally-on when no voltage is applied, has low polarization mode dispersion, and minimized operating voltage requirements.

FIGS. 7A–7D show an embodiment which is normally-on when no voltage is applied and has low polarization mode dispersion.

FIGS. 8A–8D show an embodiment which is normally-off, has low polarization mode dispersion, and minimized operating voltage requirements.

FIGS. 9A–9D show an embodiment which is normally-on, has low polarization mode dispersion, and minimized operating voltage requirements.

FIGS. 10A–10E show an embodiment which is normally-off, has low polarization mode dispersion, minimized operating voltage requirements, and a minimal number of components.

FIGS. 11A–11D show an embodiment which is normally-on, has low polarization mode dispersion, minimized operating voltage requirements, and is particularly suited to use with single-mode optical fibers, having a GRIN lens-based reflector and optical fiber mounting block.

FIGS. 12A and 12B show electrode geometries for an electro-optic phase retarder.

FIG. 13 shows another preferred embodiment of a reflective system in accordance with the invention.

FIGS. 25A and B show an embodiment of the variable attenuator with an output tap in accordance with the present invention.

DETAILED DESCRIPTION OF THE INVENTION

In order to realize the objectives of the invention in different applications, a number of embodiments are provided. Each embodiment comprises a configuration of optical elements including an electro-optic phase retarder.

Polarization direction is a term which refers to the angular orientation of a polarization plane with respect to some external reference plane and not to a direction of travel. Electrical phase shift can be expressed in degrees or radians. Degrees are used herein, but should not be confused with angular orientations.

Figure 1B:
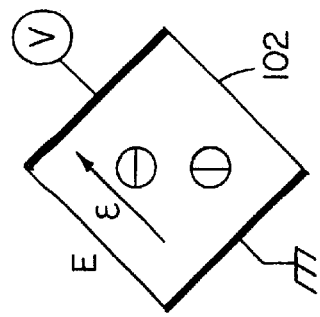
FIGS. 1A–1D show the structure, ray traces, and polarization directions of one embodiment of the invention as a modulator of transmitted light which is normally-off when no voltage is applied.
Figure 1A:
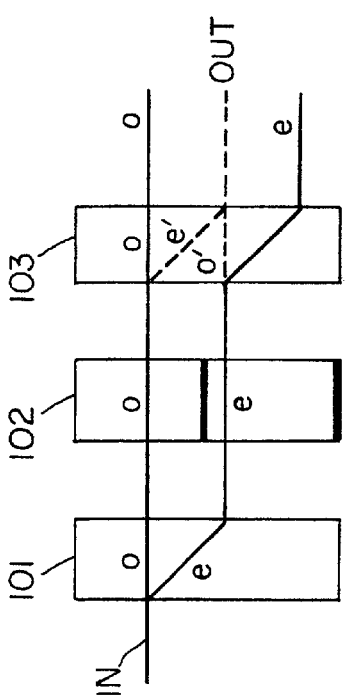
Figure 1C:
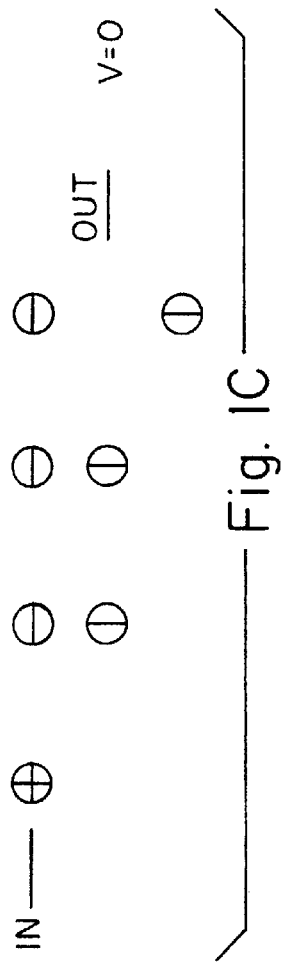
Figure 1D:
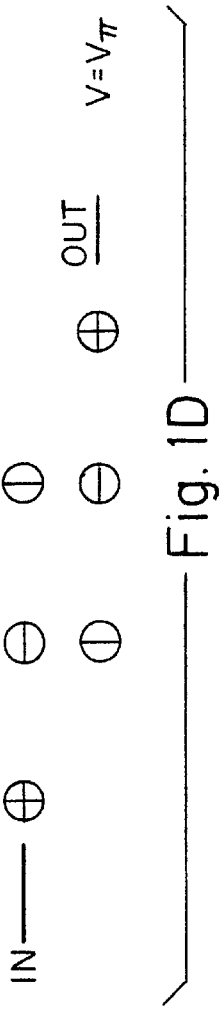

A preferred embodiment of the invention is illustrated in FIGS. 1A–1D, which show a cross section of three optical elements with a small spacing which may be zero in some cases. The beam travels from left to right in the figure and first passes through a polarization separator 101 followed by an electro-optic phase retarder 102 and then a polarization recombiner 103. The separator and recombiner can be made in several ways. FIG. 1A illustrates plates of birefringent materials having optical axes, usually designated the c-axis. FIG. 1A, each has its c-axis oriented at nominally 45° to the direction of travel of the light. The c-axis and direction of travel define a separation plane which, as illustrated, is in the plane of the paper. An end view of the phase retarder in FIG. 1B shows two electrodes arranged to provide an electric field at 45° to the separation plane with space between the electrodes to permit passage of light beams. The path of the light beam when the phase retarder is not operative (no voltage applied) is illustrated by solid rays and when the phase retarder is operative by dashed rays. (Generally, light from an optical source has a finite beam diameter and is not collimated. In many applications, a coherent light source such as a laser emitting at a wavelength in the visible or infrared regions of the spectrum can be used. For ease of understanding, the figures show the paths of central rays with no beam divergence.) FIGS. 1C and 1D show an end view of the light beams and the direction of polarization of the rays at points between optical elements.

Arbitrarily polarized light enters the separator 101 at a point labeled IN and is separated into two components, one having a polarization direction parallel to the separator (paper) plane and one perpendicular. The perpendicular one is also perpendicular to the c-axis and travels through the separator undeflected. This is called an ordinary ray and is labeled "o." The parallel one to the separation plane is deflected at an angle (shown much exaggerated). This is called an extraordinary ray and is labeled "e." If the phase retarder is inoperative, i.e., no voltage is applied, these two rays pass through unaltered and enter the recombiner 103. The original o-ray is still an ordinary ray with respect to the recombiner and passes through undeflected. The original e-ray is deflected a second time. Both rays miss the output at the point labeled OUT.

In order to transmit light to the output, a voltage, V, is applied to the phase retarder. This produces an electric field at about 45° which changes the index of refraction in the retarder for polarization components parallel to the electric field which creates an electrical phase difference compared to perpendicular components. Each of the o- and e-rays, being at 45° to the electric field, have equal parallel and perpendicular components. If sufficient voltage is applied, the parallel components' phase delay is 180°. These are then in phase with the perpendicular components, but with a negative sign so that linearly polarized beams result with a rotation in the polarization direction of the o- and e-rays by 90° as shown in the lower part of FIGS. 1C and 1D. Thus, the original ordinary ray becomes extraordinary, labeled e' and the original extraordinary ray becomes ordinary, labeled o'. The o'-ray passes through the recombiner to the output and the e'-ray is deflected and, also reaches the output. Thus, all the light from the input reaches the output. Lesser voltages produce less transmission, as will be further explained below, but the polarizations are not linear and are difficult to show graphically. Note that, the input beam could have been linearly polarized with a direction of either the o- or e-ray. In this case, there would be half as many rays but the transmission intensity results would be the same. In other words, the input beam can be arbitrarily polarized.

There are several ways to separate the two polarizations. One suitable for this invention is the use of birefringent crystals, as illustrated. These have an index of refraction for light traveling along the c-axis, which is different than the indices for light traveling along the other two directions. One well known effect is that light impinging at normal incidence on a flat plate of such material and polarized in a plane perpendicular to the c-axis (an o-ray) is transmitted, but light polarized parallel (an e-ray) is deflected. The e-ray emerges traveling in a direction parallel to the o-ray, however. With the usual notation, letting $n_e$ be the value of the c-axis index and $n_o$ the value of the indices for the other two axes, the parallel separation, often called the walk-off distance, d, of the e-ray from the o-ray is given by the formulas:

$$d = t \sin \theta \quad (1)$$

$$\tan \theta = (1-(n_o/n_e)^2)\tan \gamma/(1+(n_o/n_e)^2\tan^2\gamma) \quad (2)$$

where t is the plate thickness in the direction of beam travel, θ is the walk-off angle, and γ is the angle of the c-axis to the direction of travel in a plane containing both the c-axis and the direction of travel. d is maximized when $\tan \gamma = n_e/n_o$ which means γ is close to but not exactly 45°. However, it is usually convenient to use γ=45° and adjust t. Unless $n_e-n_o$ is unusually large, θ is at most a few degrees and, to first order, $d = t(n_e-n_o)/n_o$. Separation of the two polarizations requires that d is bigger than the beam diameter, D. Light beams do not have sharp edges but fall off as a Gaussian exponential within a few wavelengths. Because of diffraction, beams expand at a nominal half-angle given by 1.22λ/D. This is quite severe for a 1.55 μm wavelength emanating from a 10 μm diameter single-mode fiber, being about 11°. Thus, if the distance between the input and output is 1 mm, the beam expands to about 375 μm. A collimator can be used produce a larger beam with less divergence. There is a trade-off between beam size and divergence which depends on the length of the modulator. However, the length is affected by the thickness of the phase retarder which depends on the beam size.

There are a number of materials and mechanisms that can be used to produce a phase retarder which will be discussed in more detail below. Its operation in the device illustrated in FIGS. 1A–1D can be explained by assuming an ideal material which, with no voltage applied, has equal indices of refraction for all polarization directions. When a voltage is applied, the internal electric field induces a change in index of refraction (also known as field-induced birefringence), in the simple ideal case, only for polarization directions parallel to the electric field. This causes a relative phase shift in the electromagnetic fields of the light beam polarized parallel and perpendicular to the electric field in the phase retarder. On emerging, they can be represented by $\sin(\omega t - \phi)$ and $\sin(\omega t)$, respectively, where $\omega = 2\pi c/\lambda$. The change in index produces phase changes in the parallel components of each of the o- and e-ray. This means that the original o-ray will have extraordinary ray components and the original e-ray will have ordinary ray components, both of which will be collected at the output.

The amount of transmission can be found using well known analysis. In a more general case, where the angle of the electric field in the material is at an angle, α, not limited to 45°, the transmission, T, of each of the o- and e-rays is given by $T(V) = \sin^2(2\alpha)\sin^2\phi/2$ where φ is the field-induced electrical phase lag which is a function of V. When V=0 and, hence φ=0, T(0)=0, independently of the value of α. Defining "normally" as V=0, this is a normally-off modulator. When $V = V_\pi$ where $V_\pi$ is a voltage sufficient to make $\phi = \pi$ radians or 180°, $T(V_\pi) = \sin^2$). Usually, it is desirable to make $T(V_\pi) = 1$. This can be obtained if $\alpha = 45° + N \times 90°$, where N an integer including 0. In other words, the orientation can be at α=45°, 135°, 215°, and 305°. Some error can be tolerated, depending on the application. E.g., for α=44°, $T(V_\pi)$ is less than unity by 0.1% or −30 dB which is usually more than adequate. Assuming α=45°, or the equivalent, $T(V) = \sin^2(\phi/2)$.

Figure 2A:
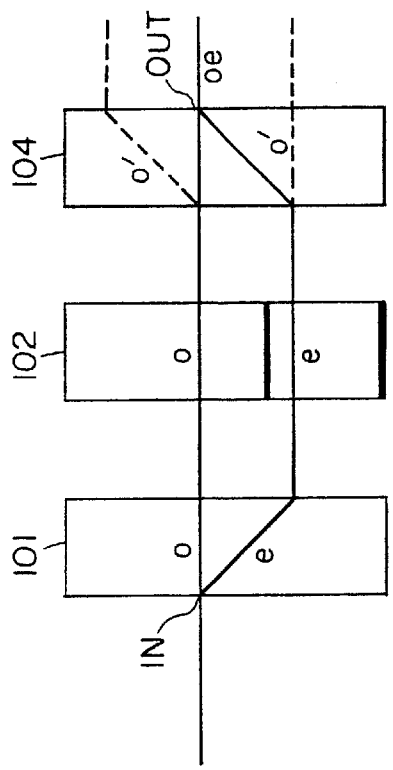
FIGS. 2A–2C show an embodiment which is normally-on when no voltage is applied.
Figure 2B:
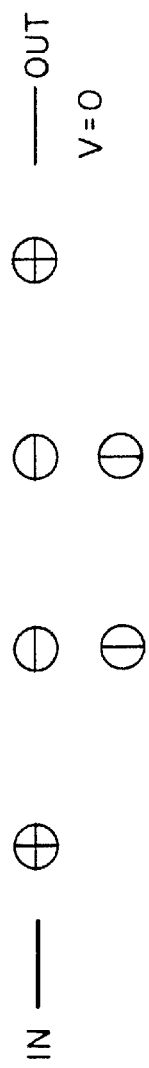
Figure 2C:
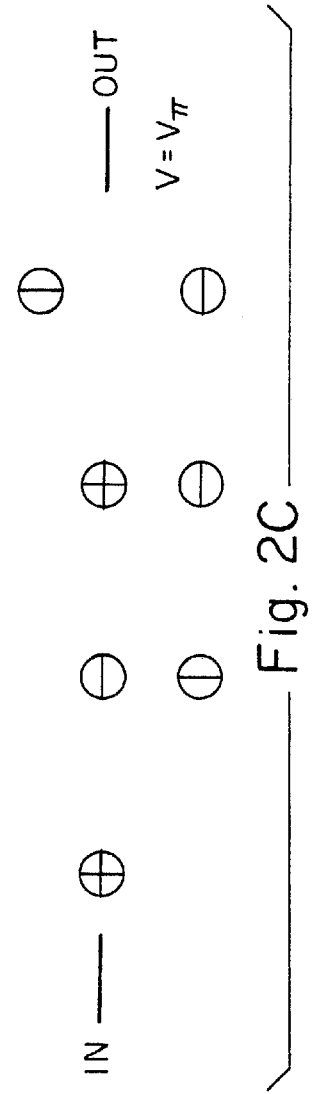
Figure 5B:
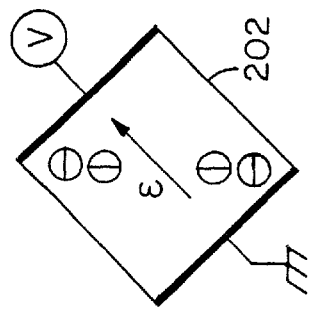
FIGS. 5A–5D show an embodiment of the invention as a modulator of reflected light which is normally-off when no voltage is applied.
Figure 5A:
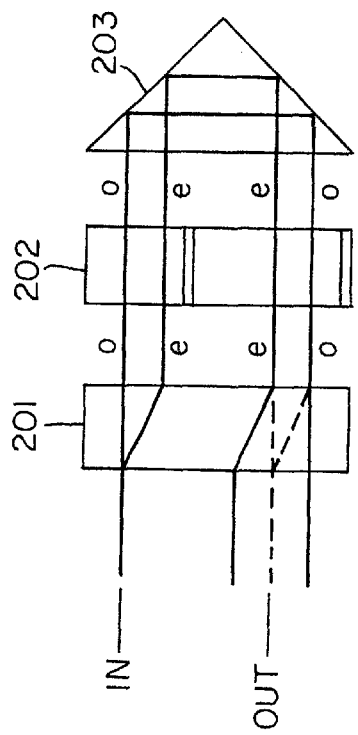
Figure 5C:
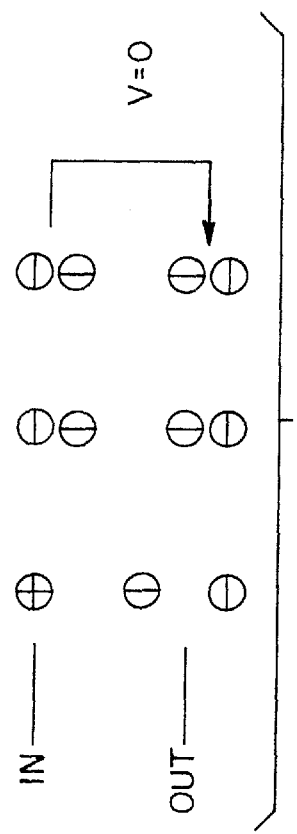
Figure 5D:
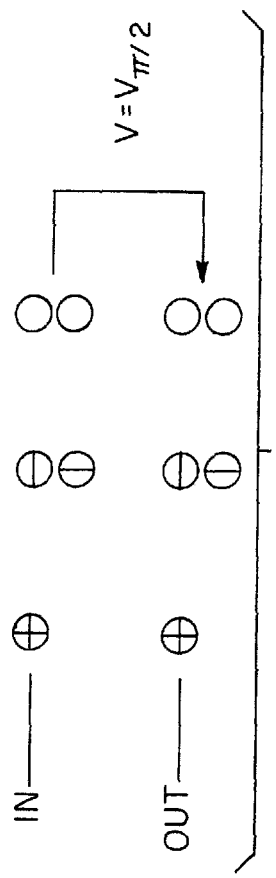
Figure 6B:
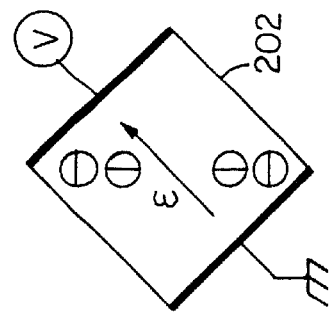
FIGS. 6A–6D show an embodiment which is normally-on when no voltage is applied.
Figure 6A:
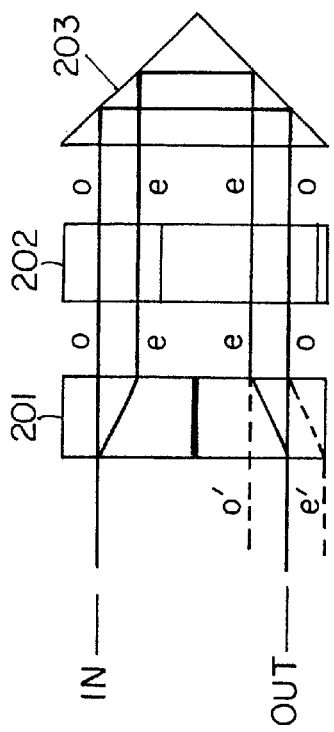
Figure 6C:
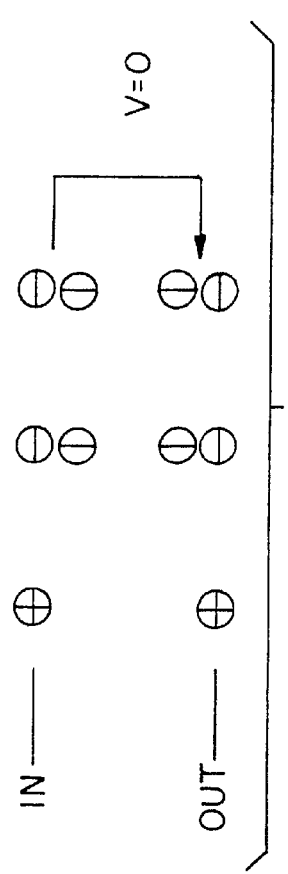
Figure 6D:
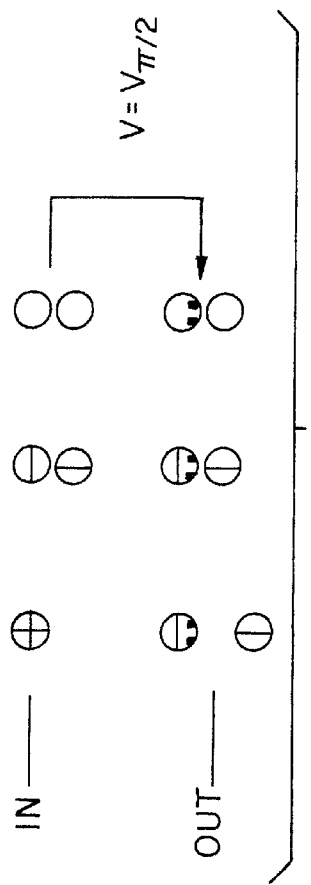

A normally on modulator can be constructed as illustrated in FIGS. 2A–2C. Here, the recombiner 103 in FIG. 1A has been replaced by a recombiner 104 with a c-axis orientation at 90° to the orientation in the separator. If so, the e-ray is deflected away from the o-ray and then deflected back to the o-ray to be collected at the output. When $V = V_\pi$, the polarization rotator interchanges the two rays and the original e-ray will become an o'-ray and not be deflected a second time while the original o-ray will become an e'ray and deflected away from the output. Between the two extremes, $T(V) = \cos^2(2\alpha) + \sin^2(2\alpha)\cos^2(\phi/2)$. When φ=0, T(0)=1, independently of α. When φ=180°, $T(V_\pi) = \cos^2(2\alpha)$. This is minimized when $\alpha = 45° + N \times 90°$. Assuming a 1° departure from ideal in α, $T(V_\pi) = 0.1\% = -30$ dB. This is usually adequate, but may not be so in every application, making alignment more critical for a normally-on modulator. Assuming a is one of the ideal values, $T(V) = \cos^2(\phi/2)$.

One disadvantage of the modulator illustrated in FIGS. 2A–2C is that there is what is called polarization mode dispersion (PMD). The transmitted e-ray is deflected twice while the transmitted o-ray is not deflected. This means that there is an optical path length difference and equivalent time delay between the two. Not only is there a small difference in path length, but the e-ray experiences a different refractive index and emerges with additional phase retardation compared to the o-ray. It can be shown that the approximate phase difference is $\Delta\phi = (360°(n_e-n_o)/\pi)(d/\lambda)$. Since the walk-off distance, d, is, at a minimum, many wavelengths, the phase difference is many cycles. Even if the number of cycles is an integer, the corresponding time delay is undesirable in some applications. In the normally-off modulator, this does not happen because the optical path lengths are the same.

A normally-on low PMD modulator can be obtained by inserting an extra half-wave plate 105 in the normally-off configuration of FIG. 1A oriented at 45°, as illustrated in FIG. 3A. The half-wave plate acts to passively interchange o- and e-rays, converting a normally-off modulator to a normally on one with the c-axes of the separator and recombiner oriented in the same direction. As illustrated, each ray undergoes one deflection. Assuming the separator 101 and recombiner 103 are closely matched, there is no dispersion.

The half-wave plates can be made from the same materials used for the separator and recombiner. In this case, the c-axis is perpendicular to the direction of travel of the light beam. Polarizations which are parallel to the c-axis are retarded in phase by a different amount than polarizations perpendicular to it. The difference is given by $\Delta\phi=2\pi(n_e-n_o)t/\lambda$ where t is the thickness. By adjusting t, $\Delta\phi$ can be made to be $\pi$ radians=180°. This means that after traversing the plate, the electric field of one polarization component has the opposite sign relative to the other compared to when they entered the plate. A little geometrical construction will show that if the incoming polarization direction with respect to the c-axis were $\beta$, the outgoing direction will be $180°-\beta$ for $(n_e-n_o)$ positive and $-\beta$ for $(n_e-n_o)$ negative. In the second case, the polarization direction is reflected about the c-axis as a mirror. However, the polarization direction of the first case is equivalent to the second and so this reflection can be used to visualize the results for both cases. Orientations of the c-axis at $\beta°+N\times45°$, produce the same results. Thus, orienting the half-wave plate c-axis at 45° to the o-ray and e-ray directions causes them to flip 45°. In other words, the directions are rotated by 90° and interchanged. There is some polarization mode dispersion, but it is slight (one-half a cycle) and could be corrected with a second half-wave plate after the modulator, oriented at 90° to the first.

A normally-off modulator could be obtained by using a recombiner with deflections opposite the separator, but this has the same large polarization mode dispersion as the previous normally-on modulator with such an arrangement. It is simpler, to remove the half-wave plate.

The four configurations just described, have a phase retarder at 45°. As FIG. 1 illustrates, the electrodes must be separated by enough to encompass the two beams. This is $D(1+2^{1/2})$. It would be desirable to minimize the separation so that the voltage required to produce the required electric field could be reduced. A configuration which allows this is illustrated in FIGS. 4A–4D. Here, first and second half-wave plates 106 and 108 are shown with c-axes oriented at 22.5° (or equivalently at 22.5°+N×45°). Half-wave plate 106 flips the o- and e-ray directions about its c-axis which is equivalent to a 45° rotation If the phase retarder is inoperative, half-wave plate 108 rotates them back so that there is no net change. The normally-off state is the same as in FIG. 1.

As illustrated in FIG. 4B, the electric field in the phase retarder 107 is at 90° to the walk-off direction and the electrode gap can be reduced to D. Since the o- and e-rays have been rotated by 45°, the condition $\alpha=45°$ is again obtained. From here the analysis is the same as for FIGS. 1C–1D. The electric fields can be arranged to be parallel to the walk-off direction, but this increases the electrode gap to 2D.

A normally-on modulator, but with high PMD, can be obtained by arranging for opposite walk-off as in FIG. 2. One with low PMD is obtained by inserting a half wave plate at 45° in FIG. 4A, as in FIG. 3A, but with the separator and recombiner having the same walk-off direction. A lower parts count alternative is to change the orientation of the second 22.5° half-wave plate in FIGS. 4A to −22.5° and leave out the additional plate. The last alternative is to change back to a normally-off modulator by using opposite walk-off, again with high PMD.

In another preferred embodiment, the simplest reflection mode configuration is the normally-off modulator illustrated in FIGS. 5A–5D. The separator and recombiner are made from a single plate 201 so that unaltered o- and e-rays are separated by two walk-off distances after two passes through the plate 201. As illustrated in the end view of FIG. 5B, the phase retarder 202 is oriented at 45° to a plane containing the o-ray and deflected e-ray (the separation plane). A simple 90° mirror 203 is used to reflect the incoming beam back through the modulator to the output.

When the phase retarder 202 is inoperative, the light is separated into two polarizations which are reflected and further separated in the second pass through the plate 201. When the voltage on the phase retarder is increased, components of both the original o- and e-rays perpendicular and parallel to the electric field in the retarder acquire a relative phase shift. This differs from the transmission mode in that the rays make two passes through the retarder acquiring equal phase shifts on each pass. Therefore, the voltage required to produce 180° phase shift between the parallel and perpendicular components can be less, i.e., $V=V_{\pi/2}$ instead of $V_{\pi}$. In the completely on state, the o- and e-rays going into plate 201 after reflection are interchanged. However, after the first pass through the retarder, their components have picked up only enough phase shift, 90°, to be circularly polarized, as illustrated, picking up the remaining 90° on the second pass.

A normally-on modulator can be produced by arranging for opposite deflection of the incoming and outgoing beams. For example, assuming the plate 201 is a birefringent plate, it can be split into two halves, one covering incoming beams and the other outgoing beams. Then the c-axes are be opposite each other, e.g., at +45° and −45°. In this case, the incoming e-ray is deflected away from the o-ray to the center and the outgoing e-ray is deflected away from the center to meet the outgoing o-ray at the output, as illustrated in FIGS. 6A–6D. However, this configuration has high PMD and there are other ways to produce normally-on modulators with low PMD. But, in general, any configuration with a single deflector plate can be split and opposite deflections provided for incoming and outgoing rays in order to change the normal transmission of the modulator from on to off or vice versa.

A normally-on modulator with no PMD can be obtained by inserting into the previous configuration a quarter-wave plate 204, either before or after the phase retarder, as illustrated in FIGS. 7A–7D. As shown in the end view, its c-axis is at 45° to the separation plane. A quarter wave plate produces 90° of phase shift between components polarized parallel and perpendicular to its c-axis. Since the o- and e-rays are at 45° to the c-axis, each ray has equal parallel and perpendicular components so that each become circularly polarized after the first pass. After reflection by the mirror 203, the second pass produces an additional 90° relative phase shift. The total of 180° phase shift produces a reflection in polarization direction about the c-axis. Since it is at 45°, the o- and e-ray polarization directions are interchanged. The deflector 201 deflects the new e-ray to combine with the new o-ray at the output.

In order to turn the modulator off, a $V_{\pi/2}$ voltage is applied to the retarder 202 which also produces 90° relative phase shift between components parallel and perpendicular to the electric field which is also at 45° to the separation plane. After the first pass through the quarter-wave plate and retarder, the o- and e-ray polarization directions are interchanged. After reflection and a second pass, these rays are interchanged again. Thus, the original e-ray is again an e-ray and is deflected a second time and misses the output as does the undeflected o-ray.

The same effect could be achieved by leaving out the quarter-wave plate and biasing the retarder with a DC voltage, $V=V_{\pi/2}$, to produce a normally on-state. Increasing the voltage to $V=V_{\pi/2}$ drives the modulator to off. However, with available retarder materials, the voltages required are high enough that this may be an undesirable alternative.

The walk-off distance, as before, should be at least a nominal beam diameter, D. However, it is usually undesirable to have light return to the input area. Therefore, the separation between the input and output should be at least 2D. This means that the electrode gap in the configurations illustrated in FIGS. 5B and 7B must be at least $D(1+2\times2^{1/2})$. The gap can be narrowed to D, if a half-wave plate is inserted between the deflector 201 and the mirror 203, either before or after the phase retarder 202. This configuration is illustrated in FIGS. 8A–8D which show a phase retarder 206 with electrodes at 90° and an electrode gap of D. The half-wave plate 205 can be made from a birefringent plate with an optical phase delay of 180° and a c-axis oriented at 22.5° to the separation plane.

As before, the extraordinary component of the incoming beam is separated and deflected from the ordinary component. After the first pass through the half-wave plate 205, the o- and e-ray directions are rotated by 45°. If the phase retarder is inoperative, these are reflected and make a second pass through the half-wave plate and are rotated back to their original direction. The new o-ray passes through the deflector 201 and the e-ray is deflected so that both rays miss the output. The modulator is normally-off.

Application of $V_{\pi/2}$ to the retarder 202 adds 90° of phase delay to the components of the o- and e-rays which are parallel to the electric field. This causes both rays to become circularly polarized. After reflection by the mirror 203, the phase retarder adds another 90° of delay to the same components of the o- and e-rays which were delayed on the first pass, producing linearly polarized rays, but with a 45° rotation compared to the polarization direction before the first pass. The half-wave plate 205 then provides another 45° of rotation so that the o- and e-rays are interchanged. The original e-ray, now an o-ray, is undeflected and the original o-ray, now an e-ray, is deflected and both reach the output, as illustrated in FIG. 7A.

A normally-on modulator with low PMD is produced by adding a quarter wave plate. This operates similarly to the configuration in FIG. 7A to interchange polarization directions compared to a configuration without the quarter wave plate. Another way to accomplish the same result without adding a plate is to split the half-wave plate 205 of the last configuration into two halves—one half covering the incoming beam area and the other the reflected outgoing beam area as seen in FIGS. 9A–9D. As illustrated in the end view in FIG. 9B, the outgoing beam half 205B has its c-axis rotated 45° (or equivalently, 135°, 225°, or 315°) with respect to the orientation of the c-axis of the incoming beam half 205a. When the phase retarder 206 is inoperative, the 45° polarization direction changes caused by half-wave plate 205A to the incoming beam are further increased by 45° by the half wave-plate 205B to the outgoing beam. Thus, the original o- and e-rays are interchanges so that they converge at the output. The modulator is normally-on. A 45° Faraday rotator in place of plates 205A and 205B would have the same effect. When sufficient voltage is applied to the phase retarder, the beams are rotated by 90° after traversing the retarder twice. In this case, when they pass through the plate 205B the further 45° rotation brings the total to 180°, so that the o and e-rays regain their original polarization direction.

The beams in the above configurations all travel in one plane which has been designated the separation plane. Physically, it is a plane which contains the o-ray and the e-ray as they exit from the first separator or deflector. All other component are referenced to this plane, either necessarily or by design. A reflection mode design in which that is not so, has advantages in some situations. In this one, assuming it is a birefringent plate, the c-axis of the deflector is not in the paper plane, but canted into the paper. If it were a cubic block (which would usually be much too thick), the c-axis would be along a diagonal running from the front upper left to the back lower right.

FIG. 10A shows a cross-section of the deflector 208 where, however, the end view of FIG. 10B shows its c-axis at 45° with respect to the plane of the paper and at 45° with respect to the direction of beam propagation. This has two effects. First, what is an o- or e-ray with respect to plate 208 is no longer ones that are horizontal or vertical, respectively, but ones that are parallel or perpendicular to the c-axis at 45°, as illustrated. The e-ray is now deflected at a 45° angle. In this case, the separation plane is rotated by 45° with respect to the paper plane. The end view also shows the two beams with their polarization directions and displacements. The advantage of this design is that it uses the fewest components while allowing a 90° electric field orientation. The disadvantage is that the electrode gap is $D(1+2^{-\frac{1}{2}})$ instead of D, but this is still an improvement over $D(1+2\times2^{-\frac{1}{2}})$.

As illustrated in FIGS. 10A–10E, operation is similar to the other reflection mode normally-off modulators with no PMD. Like those, a normally-on modulator with no PMD can be obtained by inserting a quarter-wave plate at 45° or equivalent, either before or after the retarder 209.

When the beam is fairly large with minimal beam divergence, the previous configurations may not require additional components. However, when it is desired to transmit the light to a small diameter receiver such as an optical fiber, a lens or equivalent which focuses the transmitted light is required. Even if the input is from a same-size optical fiber, the beam diverges while passing through the modulator. One approach is to collimate the input to reduce its divergence and focus the output with an identical lens.

The reflection mode has a similar problem. Additionally, for use with fiber optic communications applications, it is usually desirable to make modulators as small as possible. This means that there may not be much room between the input and output for collimators. A solution is illustrated in FIGS. 11A–11D which adds several components. An adaption of FIG. 9A is used for illustration, but the same additions can be made to any of the other reflection mode configurations.

First, the input is provided by the optical fiber 301 and the output goes to fiber 302. These are held in a precise spaced-apart position (shown exaggerated) by the fiber mounting block 303. The function of the deflector 304, split half-wave plates 305A and 305B, and phase retarder 306 are as described for FIG. 9A for elements 201, 205A and 205B, and 206, respectively. Following the retarder is a cylindrical rod-type GRIN lens 307 coated on the end away from the fibers by a reflective surface 308. The end view shows the orientation of the c-axes of the half-wave plates 305A and 305B on which is superposed a view of the retarder 306. In this application, it is desirable to keep the longitudinal spacing between components as small as possible in order to reduce the effects of beam divergence.

The GRIN lens 307 functions as a collimator and collimator. The input beams expand and become more collimated as they travel to the mirror 308 striking it an angle. After reflection by the mirror, the output beams are refocused as they travel back to the output. The center of the beams enter and emerge from conjugate points which are equidistant from the central axis. Otherwise, operation is the same as that described for FIGS. 9C–9D as illustrated by the identical polarization orientation diagrams of FIGS. 11C–11D. During the on state, ideally, the output fiber collects all the light from the input fiber 301 and the light experiences no insertion loss. Since typical single mode fibers operating at communications wavelengths of 1.3 μm and 1.55 μm have cores on the order of 10 μm, alignment of fibers 301 and 302 is critical. The fiber alignment problem and various solutions are known in the art, but the use of the block 303 to hold the fibers at a fixed separation, e.g., 2D, on the same side of the modulator makes this easier. One degree of freedom is eliminated and the block is moved to maximize transmission in the on-state.

The general requirement for the electro-optic phase retarder is that, when a voltage is applied, a phase shift of $\pi/2$ for the reflection mode and $\pi$ for the transmission mode is produced between differing polarization directions. Preferably, the material has a high electro-optic coefficient in order to reduce operating voltages to less than 500 volts. Also, the material isotropic index of refraction sufficient to achieve polarization-independent operation. Preferably, the mechanical characteristics allow formation of a bar or plate. Of course, the material must be transparent at the wavelength of interest, e.g., between 1200 nm and 1600 nm.

These requirements are satisfied by a class of ferroelectric complex oxides which: are optical isotropic; have a Curie temperature less than about 300° C., so that electro-optic coefficients are high near room temperature; have a diffusive phase transition, so that the temperature dependence of the electro-optic coefficients is lessened; and which are not permanently poled by moderate electric fields since materials with a low Curie temperature that become permanently poled are less stable. Example material systems are: lead zirconate titanate (PZT), lanthanum modified PZT (PLZT), lead manganese niobate (PMN), and a solid solution of lead manganese niobate and lead tantalate (PMN-PT). More members of this class may be discovered in the future.

PLZT with a nominal 9/65/35 La/Pb/Zr composition is a preferred material. This composition is known to be transparent in a range from 450 nm to 7 μm, see, for example, Lionel M. Levinson, Electronic Ceramics, Chapter 7 (Marcel Dekker, New York, 1987). In the form of hot-pressed ceramics, it is optically isotropic and exhibits little birefringence with zero applied voltage. The electro-optic coefficient is high and the effect is approximately quadratic with voltage.

An electrode geometry which takes advantage of this material is illustrated by the transverse field configurations illustrated in FIGS. 12A and 12B. The electric field is 90° to the light beam so that polarization-independent operation can be achieved. Since the effect is based on the electric field in the material (designated $\in$ and illustrated by dashed arrows in the figures), it is desirable to arrange the electrodes as close together as possible to minimize the control voltage. FIG. 12A illustrates the embodiments in which a half wave plate was used to rotate the polarization directions by 45° so that the electrode gap, g, could be as small as possible. In those, g can be as small as the beam diameter. For a single-mode fiber, this is larger, typically 100 μm or more, than the fiber core diameter, typically 10 μm, because of beam divergence.

In order to obtain a uniform electric field, placing electrodes on the side of a bar is preferable. Another solution is to place electrodes on the front and back of a plate and connect them. Achieving uniform fields requires a larger electrode gap than the minimum. However, this can be reduced by using a groove structure as illustrated in FIG. 12B. This shows an electro-optic plate with grooves of depth, e, and width, w, on either side of the beam transmission area. Electrodes are deposited on both sides and connected. With this configuration, adequate field uniformity can be obtained even though the electrodes are not widely separated.

Another preferred embodiment uses a single-piece birefringent plate 304, as illustrated in FIGS. 11A–11D, for operation at 1550 nm. The birefringent plate 304 was 0.5 mm thick YVO$^4$. Based on an $n^e - n^o = 0.2$ at 1550 nm (see the supplier's data sheet in "Crystals & Materials, Laser Accessories," from Crystal Guide 1996, p. 51, CASIX, Inc. Monrovia, Calif.), this produces a separation of 50 μm for the o- and e-rays. The half-wave plates 305 was 0.28 mm thick. The GRIN lens 307 was a 3 mm diameter Model SLW 300-025-156 from Nippon Sheet Glass Co., Ltd., sold under the trademark SELFOC. This is nominally a quarter pitch, 7.89 mm long, and to compensate for the extra optical path length in the other elements, 1.1 mm was cut off. The mirror 308 was evaporated gold. The phase retarder 306 was made from a commercially available (Aura Ceramics, New Hope, Minn.) 375 μm thick 9/65/35 PLZT hot-pressed bulk ceramic. The electrode configuration was as in FIG. 12A with a separation, g, of 200 μm. Electroless-plated nickel, followed by gold, were used as electrodes.

The fibers 301 and 302 were single-mode, model SWF-29, from Corning, Inc. (Corning, N.Y.) with a core diameter of 10 μm and an overall diameter of 125 μm. These were mounted in block 303 in V-grooves etched in a silicon slab at a distance of 150 μm. (A smaller fiber separation reduces distortions in the GRIN lens which can be obtained by removing the cladding, but the separation should be greater than about twice the walk-off distance, d, if preventing transmission back into the input fiber in the off state is desirable.) Block 303 was aligned with the rest of the assembly by maximizing the transmission from fiber 301 to fiber 302 in the on state. Use of the just described block with both fibers on the same side so that their separation was fixed, made this relatively easy. All surfaces of the optical elements were anti-reflection coated. The plates were held in close proximity but with an air gap with an adhesive outside the beam transmission area. Alternatively, if only low power beams are used, index matching adhesive could be used and the air gap eliminated.

Another preferred embodiment of the invention is illustrated in FIG. 13. Input fiber 402 extends through fiber retaining substrate 406 and is optically coupled to ¼ pitch GRIN lens 408. The element 410 is a birefringent wedge which separates the beam into components that are coupled to retarder 412 as described previously herein. Reflector 414, such as a mirror, directs the optical signal back through retarder 412, element 410 acting as a combiner, lens 408 and couples the modulated light into output fiber 404.

Figure 14:
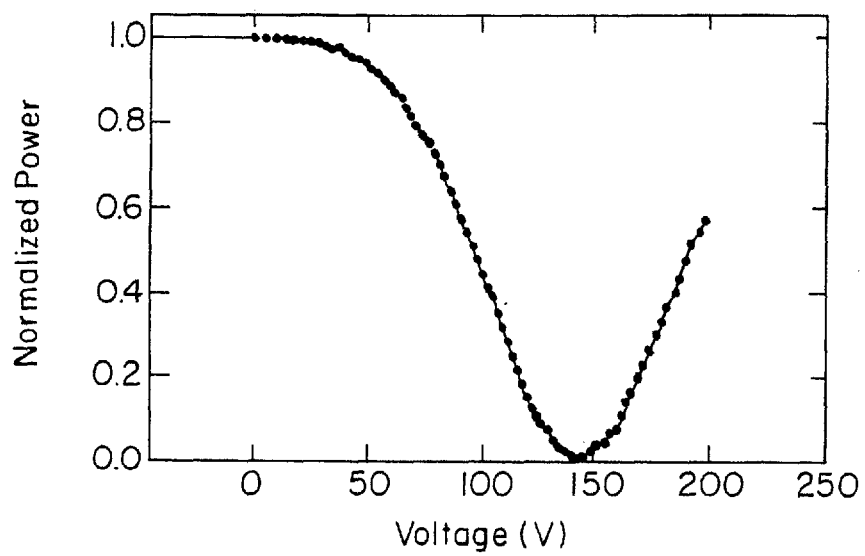
FIG. 14 shows attenuation of light beam intensity as a function of control voltage.

FIG. 14 shows the modulation characteristics of the device with a DC voltage driver. An InGaAsP/InP diode laser was used as a 1550 nm light source into fiber 301 and the output from fiber 302 was detected with an InGaAs photo detector. In this embodiment, the modulator is normally-on, but the light transmission is reduced to zero when the control voltage reaches $V_{\pi/2}$ which, in this case, is 150 volts. The actual transmission at zero volts was not 100% but showed an insertion loss of 0.8 dB which is still a large improvement over the 3 dB loss of previously described high speed devices. The actual transmission at $V_{\pi/2}$ was not zero but attenuation was 30 dB. It should be noted that this is one part per thousand. Very little scattering due to imperfections in the optical elements is required to cause this much light to be deflected into fiber 302. It was found that the sensitivity to different polarization directions of the input light was 0.07 dB.

Figure 15:
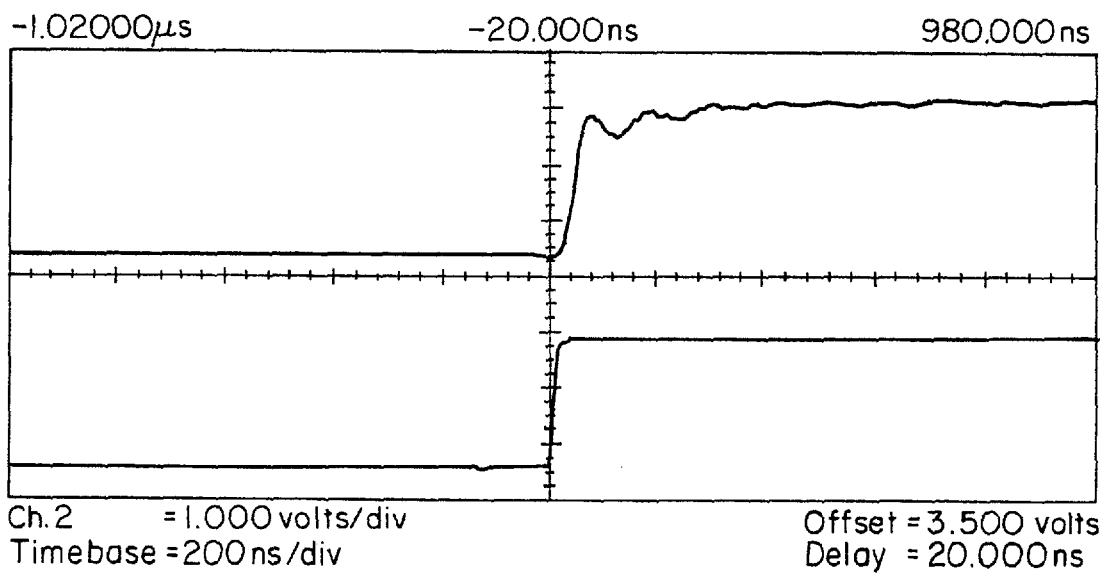
FIG. 15 shows the full signal response time of light modulation to a control voltage pulse.

The response time of the modulator was measured using the same 1550 nm InGaAsP/InP light source, but the DC driver was replaced with a model 828A high-voltage high-speed driver from Analog Modules, Inc. (Longwood, Fla.) and the InGaAs photo detector replaced with a small-area high-speed Ge photo detector. Although there should be no effect on response time, it was measured with a normally-off modulator constructed using a single piece half-wave plate 205, as illustrated in FIG. 8A. The $V_{\pi/2}$ (magnitude approximately 170 volt) fast-risetime voltage pulses were applied with a repetition rate of 1 kHz. FIG. 15 shows an oscilloscope display with the upper trace proportional to the light detected in fiber 302 and the bottom trace showing a sample of the voltage pulses. The light amplitude 10–90% risetime was about 40 ns. It was found that, due to heating in the enclosure, the modulator was running at about 6° C. above room temperature which is know to decrease the response time and slightly increase the $V_{\pi/2}$ voltage. When kept at room temperature, a 100 ns risetime and a 150 volt $V_{\pi/2}$ were more typical. When speed is critical, a heater could be intentionally provided.

In addition to yttrium orthovanadate ($YVO_4$), birefringent deflector plates can be made of other birefringence materials such as calcite, lithium niobate, or rutile. Rutile may be preferable because it has a larger difference between $n_e$ and $n_o$, so that the thickness of the plate can be less. As a result, the beam diverges over less distance and a smaller electrode separation and drive voltage can be used. The same rationale applies to using rutile for the quarter and half-wave plates, but these are already so thin that commercial suppliers have difficulty in fabrication. Another well known method of making the equivalent of half- and quarter-wave plates is to use optically active materials such as quartz.

Still a different approach to making polarization separators is to use birefringent material, but in the form of wedges or tapered plates. These produce an angular deflection as opposed to a lateral separation. While more difficult to make and assemble than flat plates, they provide polarization directions after the first deflector which are at 45° to the plane of deflection. This means that transverse fields can be used with a minimum gap without having to rotate the polarization with a half-wave plate.

In the reflection mode, in addition to the illustrated flat mirrors at 90° and GRIN lens with reflector, the reflection function can be produced with a number of optical elements including corner cubes, lenses focused on flat transverse mirrors, plano-convex lenses with the plano side mirror coated and the convex side toward the input and output, etc.

The working example used a narrow band 1550 nm wavelength, but limitation on the wavelength is not so specific nor narrow. The primary limitation on a particular wavelength arises because of the need for material transparency. In addition, since the plates are a fixed thickness, the phase delay will change with the wavelength and, as a secondary effect, the index of refraction changes with wavelength. Thus, performance of the modulator will gradually degrade as wavelengths different from the designed for wavelength are used. It should also be understood that various orientation angles are given as ideals. To the extent that there is mis-orientation, of less than 5 degrees for example, the performance will not be ideal, but the modulator will still function.

For use with fiber-optic waveguides, which are small diameter sources of diverging light, in the reflection mode, it is particularly advantageous to use a rod-type GRaded INdex (GRIN) lens with a mirror on the end opposite the rest of the attenuator. Without implying a limitation to low frequencies, herein, attenuator is used synonymously with modulator. The GRIN lens collimates the input beam, reflects it from the mirror, and refocuses it on the output fiber. The fibers must have a particular relation to the central axis of the lens as well as each other. Single-mode versions of these fibers have 10 μm diameters so that alignment is difficult. However, if the fibers are fixed in a precision mounting block, e.g., a silicon slab with photo-lithographically etched parallel V-grooves, alignment is much easier. This is because one degree of freedom has been removed and the block can simply be moved until maximum transmission is obtained in the on-state.

Selecting a material for the electro-optic phase retarder depends on the fact that for light of wavelength, λ, traveling through a material in which the optical thickness, ϕ, changes, the change in phase, θ, is $$\Delta\theta=2_\pi\Delta\phi/\lambda\text{(radians)}. \qquad (3)$$

In general, for any material with an optical path length, D, index of refraction, n, and an applied voltage producing an electric field, ξ, one can write:

$$\Delta\theta=n\Delta D+D\Delta n=nD[d\xi+\gamma\xi^2-0.5n^3(r\xi+R\xi^2)] \qquad (4)$$

The four terms on the right represent the piezoelectric, electrostrictive, linear electro-optic (Pockell's) and quadratic electro-optic (Kerr) effects with coefficients, d, γ, r, and R, respectively. All materials exhibit the effects which depend quadratically on ξ to a greater or lesser extent. There also exist 20 classes of piezoelectric crystals with no center of symmetry that also exhibit the two effects which depend linearly on ξ. In many devices, the range of Δθ required is from 0 to π radians. At π radians, Δϕ has change by half a wavelength. Materials are often characterized by the voltage required to do this, the half-wave voltage, $V_\pi$.

A number of electro-optic materials are available, but many require on the order of kilovolts to obtain an appreciable phase change. Ferroelectric lead lanthanum zirconate titanate (PLZT) of composition PbxLa1−x(ZryTiz)1−x/4(x= 9, y=65, z=35) does not exhibit large linear effects (d=r=0) but has high quadratic coefficients, γ and R. It is commercially available as hot pressed ceramic plates from Aura Ceramics (New Hope, Minn.). The electric fields for full modulation are considerably higher than for liquid crystal phase retarders, but the response time is much shorter.

One problem is that, although the above composition minimizes hysteresis, it does not eliminate it. This means that Δθ exhibits hysteresis as a function of control voltage and depending on the history of applied voltages. Another problem is that, although not as temperature sensitive as some other materials, it is still severe enough to be unattractive outside a temperature controlled environment.

Referring again to the embodiment illustrated in FIG. 14, the transmission for a normally-on attenuator, for example a PLZT-based attenuator, is given theoretically by $T(V)=\cos^2[(V/V_\pi)^2]$ where V is the voltage on the phase retarder. When $V=V_\pi$, T=0. For $V>V_\pi$, T starts to increase. For a normally-off attenuator, the formula is $T(V)=\sin^2[(V/V_\pi)^n]$.

In the case of this attenuator, after being set to fully on at room temperature, the attenuation could reach 15 dB by the time it was heated to 75° C. This is obviously not desirable. One possible solution is to measure the output of a separate identical reference attenuator with a fixed known light source and use feedback to control the transmission. The same voltage would then be applied to control the main attenuator on the assumption that it would respond in the same way. However, the cost of providing a duplicate reference attenuator is unattractive.

Equation (4) is commonly written in that form because it is convenient to describe the phase lag generated by an electric field generated by an external voltage. This is adequate for non-ferroelectric materials that do not exhibit hysteresis. However, it is less useful when R is a function of $\xi$. Some time ago, it was observed that the equation could be written in terms of the dielectric polarization, P. See M. DiDomenico et al., "Oxygen Oxyhedral Ferroelectrics I: Theory of Electro-optic Non-linear Optical Effects," J. Appl. Phys., vol. 40, p. 720 (1969). Physically, the electro-optic effects depend on the internal electric field that takes into account the electric field of externally induced dipoles in the material. The theory yields the equation $\Delta n=0.5n^3 gP^2$ the relation between $\Delta n$ and P shows less hysteresis and is less affected by temperature changes.

Figure 16:
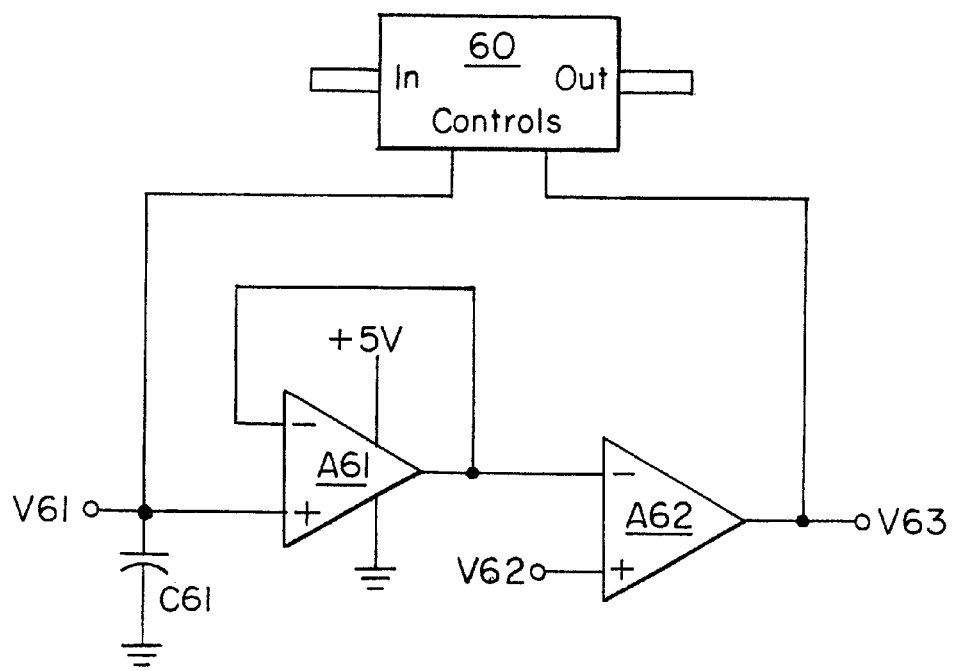
FIG. 16 illustrates a preferred embodiment of the present invention using an integration capacitor to compensate for environmental changes.

Accordingly, in one embodiment, the hysteresis is avoided by making use of the circuit illustrated in FIG. 16. This shows an attenuator 60 having an optical input IN and an optical output OUT. Fiber-optic cables can be used to provide coupling to the attenuator 60. The attenuator 60 has two electrical connections labeled CONTROLS that are essentially connections to electrodes that control the birefringence of a material inside the attenuator. Electrically, the birefringent material can be modeled as a capacitor, having some leakage current, in series with the control connections. For one PLZT ceramic-based attenuator, the capacitance is about 400 pF. Even though the capacitor electrode area is small and the distance between electrodes is relatively large, the capacitance is this big because the dielectric constant, E, of the PLZT material is large.

One side of the PLZT capacitor is connected to the non-inverting input of amplifier A61 and one side of a capacitor C61. Amplifier A61 is a low current leakage voltage buffer. Its output is connected to the inverting input of amplifier A62. For PLZT-based attenuators, this should be a high voltage amplifier having an output greater than the half-wave voltage, $V_\pi$, that over the temperature range of interest is 350 V in one embodiment. Its non-inverting input is connected to a variable voltage V62 and its output is connected to the other side of the PLZT capacitor.

When the circuit is turned on, A62 will drive current through the attenuator 60 until the voltage V61 on C61 equals the control voltage V62. The value of V63 at this point is given by V63=V61((C61+Cp)/Cp) where Cp is the value of the PLZT's capacitance. The maximum value of V61 is Cp/(C61+Cp) times the maximum value of V63. Since V63 can be about two orders of magnitude larger than the maximum input voltage to A61, C61 should be much larger than Cp. If, for example, $V_\pi$=350 volts, then C61 should be 15,000 pF to limit V61 to less than 10 volts. However, larger values, up to about 40,000 pF are desirable to reduce the errors due to leakage current through the PLZT material. On the other hand, if C61 is too large, errors due to amplifier offset voltages become important because the maximum control voltage becomes too small.

In the event the attenuator 60 undergoes a temperature change, so that, for example, the dielectric constant of the PLZT changes, the circuit maintains a constant voltage on C61. This means the charge, C61·61, does not change, i.e., there is no current flowing through C61. Therefore, the charge on the PLZT material, Cp·Vp, where Vp is the voltage across the PLZT, stays constant. Thus the quantity $\in\xi$, where $\xi$ is the electric field in the PLZT material, stays constant so that the polarization P, given by $P=(\in-\in_0)\xi\approx\in\xi$ is almost constant (within a fraction of a percent). As a result, the transmission through the attenuator, which is controlled by P, stays practically constant. Hysteresis, common to these ceramic materials, is also almost eliminated because the circuit actually controls the polarization through changes in the applied voltage V63.

The circuit illustrated in FIG. 16 was constructed using a National Semiconductor, Santa Clara, Calif., LM6042 electrometer grade operational amplifier having a leakage current of 2–4 fA at room temperature for A61. Although a bipolar output amplifier is not necessary, it was convenient to use a model PA42a high voltage (350-volt) operational amplifier from Apex Microtech Corporation, Tucson, Ariz. model PA42a. Capacitor C61 was a 15,000 pF low leakage polystyrene dielectric type. Without the circuit, even when kept at nominal room temperature, the transmission of a prototype attenuator drifted badly. With the circuit connected, there was no noticeable drift over 16 hours and qualitatively, it was temperature insensitive.

Figure 17:
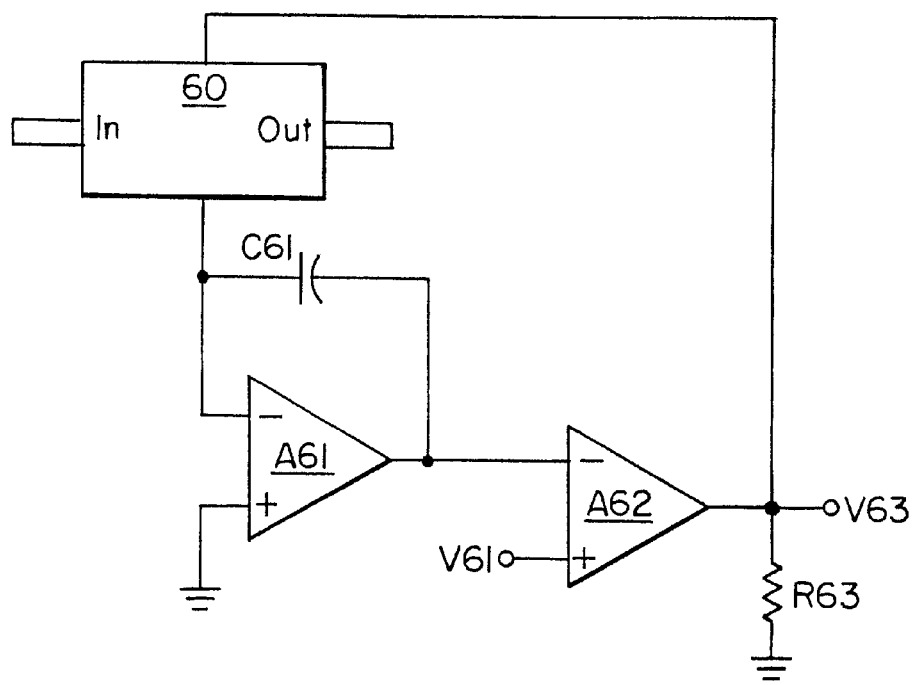
FIG. 17 illustrates a variation of the embodiment shown in FIG. 16.

FIG. 17 illustrates a circuit variation of the embodiment shown in FIG. 16. The charge from the attenuator 60 is integrated by capacitor C61. The output of A61 is –Q/C61 where Q is the charge on the attenuator. With the feedback loop, Q=C61·V61, where V61 is an input control voltage.

Unfortunately, in both circuits, even if C61 is a low leakage polystyrene type, leakage current from the PLZT material, estimated to be on the order of 1 pA, will eventually charge C61 to a significant fraction of the control voltage V61. One possibility is to periodically set V63 to zero and discharge the capacitors. Where this is acceptable, the simplicity of these circuits is advantageous.

Another application for the two aforementioned embodiments is in the control of piezoelectric mechanical actuators. These are used to make small movements on application of a voltage. Control often requires using a laser interferometer and counting interference fringes.

Figure 18:
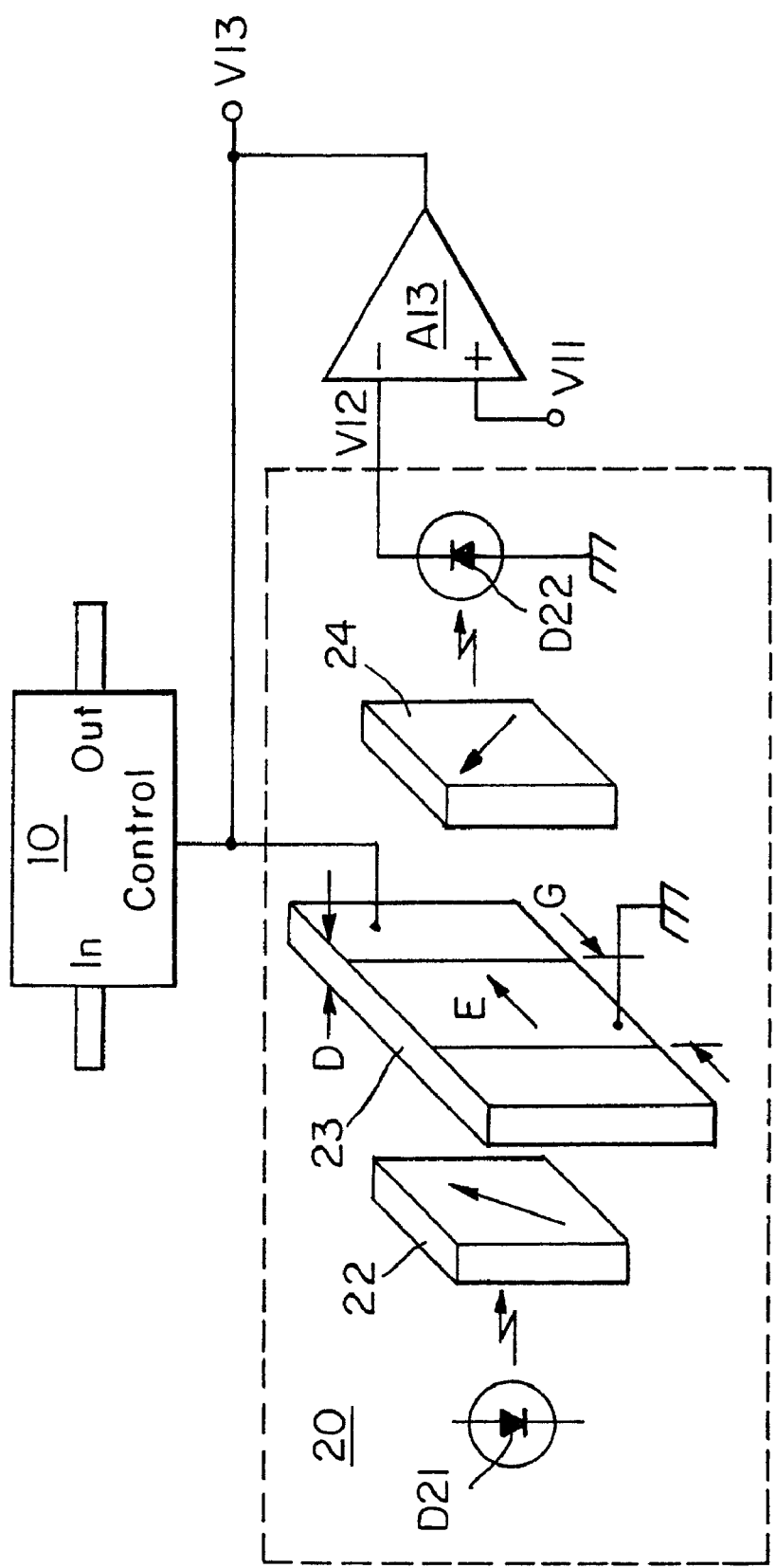
FIG. 18 illustrates a basic reference attenuator used in another preferred embodiment in accordance with the present invention.

In another embodiment, a simple inexpensive reference attenuator is used to control the main attenuator. This has a nearly identical electro-optic plate as in the main attenuator, but in a much simpler and less expensive attenuator configuration as illustrated in FIG. 18. The main attenuator is illustrated by the block 10 having an optical input port, an optical output port, and an electrical control port. The reference attenuator, block 20, contains electro-optic components comprising a light source D21 such as a light emitting diode or laser, a linear polarizer 22, an electro-optic phase retarder 23, a second linear polarizer 24, and a photodiode light detector D22. The electro-optic phase retarder has two electrodes separated by a gap, G, and an optical path length, D.

Physically, the polarizers are cemented to either side of the electro-optic plate and the two diodes face each other from either side. Alignment is usually not critical because the beams are fairly large and the optical path is simple. This system is stable with temperature, however.

Referring again to FIG. 18, the reference attenuator 20 and the main attenuator 10 have the same voltage applied. They are also in close physical proximity so that they experience similar environmental changes. The first polarizer is at an approximately 45° angle to the illustrated electric field direction caused by a voltage V13 on the electro-optic plate 23. If the second polarizer is at 90° to the first, the configuration is normally-off, i.e., with no voltage on the electro-optic plate (assuming no natural birefringence) no light reaches the detector. The electric field in the electro-optic plate 23 is transverse to the direction of beam propagation and the electrodes are separated by a gap, G. When a voltage is applied to the electro-optic plate, the field-induced birefringence rotates the optical polarization direction so that some of it can pass through the crossed polarizer and reach the detector.

The mechanism is that light source D21 is linearly polarized by the polarizer 22. The polarized light has equal components perpendicular and parallel to the electric field at 45°. With a-voltage applied, those that are parallel are retarded in optical phase as they travel through the plate's thickness D. The effects may be visualized as rotating the polarization direction of the beam. When a half-wave voltage is applied, the component parallel to the beam is 180° out of phase with the perpendicular component so that its direction is reversed. The net result is that the overall beam is polarized at 90° to its original direction and passes through the second polarizer. The 45° angle is not critical, but deviations require a higher V13 to produce the same modulation. A normally-on version can be obtained by aligning both polarizers. Both versions have the same theoretical T(V) formula as given above for the more complicated attenuator.

It is not necessary for the reference and the attenuator 30 to function identically, as long as they have the same environmental dependence. The major requirement is that the main and reference electro-optic plates must have the same polarization (P), and the same applied electric field. This can be obtained by using the same gap between electrodes and electrically connecting the electro-optic plates. A problem may arise, however, if they have the same optical plate thickness, D. As illustrated in FIG. 1, the modulation becomes double valued for $V > V_\pi$. Therefore, D for the reference should be adjusted so that $V_\pi$ on the main attenuator can be reached before the reference. Otherwise, positive feedback will result in the reference.

From Equations 3 and 4, for a purely quadratic electro-optic effect, $$V_\pi = (\lambda G^2 / n^3 R D_m)^{1/2} \qquad (5)$$

and $$D_d = \lambda G^2 / n^3 R (V_\pi + \Delta V)^2 \qquad (6)$$

can be used to calculate $V\pi$ for the main attenuator and the path length, $D_d$ for the reference. $\Delta V$ provides a margin of safety. It should be as small as possible to keep the two pieces closely matched. R is used instead of g because its value is more readily available and is an approximation to the mean of the hysteresis values. For materials for which n and R are not known, equations (5) and (6) can be used to scale the results of a $V_\pi$ at different wavelengths. In particular, for PLZT ceramics, there is a batch to batch variation in R and scaling may be essential for precise results.

Other differences between the main and reference are less critical. For example, the first polarizer 22 in the reference blocks half the light from the source D21. This is not a problem because one can find light sources D21 and detectors D22 which yield a high enough signal-to-noise ratio. As a second example, in this simple configuration, light makes only one pass through the electro-optic plate 22, whereas the attenuator can be used in a reflection mode in which the light makes two passes through the electro-optic plate in the attenuator 30. In this case, $D_m$ is about double the physical thickness.

If the gain of amplifier A13 is large enough, then a voltage V11 applied to its positive input will cause the output voltage V13 to increase until the signal V12 from the photo detector D22 and transimpedance amplifier equals V11. A change in environmental parameters will initially change V12 but the amplifier changes V13 to compensate. If the reference 20 and controlled attenuator 30 are in the same environment, then the compensation will be suitable for both. Since the photo detector voltage V12 is independent of hysteresis, V13 will automatically be adjusted to compensate for that, also. In other words, by measuring an effect that depends on the polarization there is no need to measure the charge and polarization as in the first embodiment.

Figure 19:
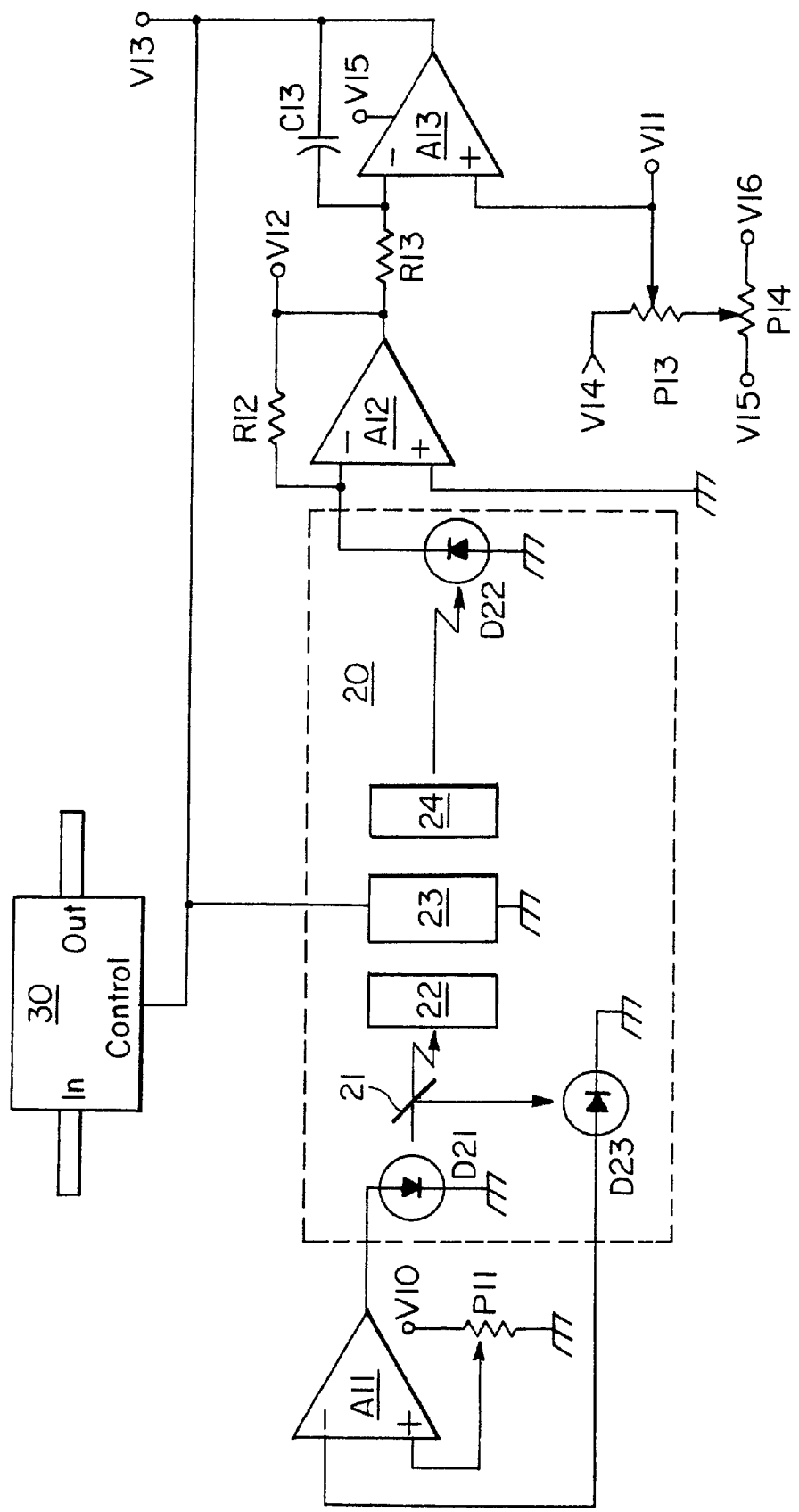
FIG. 19 shows additional details of the embodiment illustrated in FIG. 18.

The principles of operation may be further understood by considering a working prototype example. The circuitry for this embodiment is illustrated by the schematic, FIG. 19. The stability of the device depends on the stability of the reference light source. The reference attenuator 20 was modified to include a partially reflecting mirror 21 that reflects a small portion of the light from the source D21 to a second photodiode light detector D23. In conjunction with amplifier A11, this forms a feedback loop so that the output from D21 stays constant at a value determined by the potentiometer P11. Feeding D21 with a current source is possible, but it was found that the light output was too sensitive to temperature changes even with an attempted temperature compensation of the current source. With the illustrated approach, the main requirement is that the light sensors D22 and D23 are insensitive to temperature changes. (Phototransisitors can be temperature sensitive; photodiodes are preferred.)

The electro-optic plate 23 was made from 400 $\mu$m thick 9/65/35 PLZT hot-pressed bulk ceramic as was the electro-optic plate in the main attenuator. For both the reference and main attenuator, the received plates were cut and polished to achieve desired dimensions. The light source D21 is an 0.88 $\mu$m GaAs light emitting diode. The photo detector D22 and D23 are silicon photodiodes. Use of 1.33 $\mu$m emitting and detecting photodiodes yielded similar results, but are more expensive. Amplifier A12 acts as a transimpedance amplifier and converts the photocurrent from D22 into a voltage V12. (In practice, a transimpedance amplifier is necessary for D23, also.) Capacitor C13 in conjunction with resistor R13 rolls off the gain so that the overall feedback loop is stable.

The attenuator was controlled by an external voltage V14 fed to one end of a potentiometer P13. The other end was connected to a much smaller value potentiometer P14 that can be used to adjust for various small offsets in the loop. The voltage V11 at the wiper of P13 was connected to the non-inverting input of high voltage amplifier A13 with a supply voltage V15. This is being operated as an integrator so that the voltage V13 continues to change as long as there is a difference between V11 and V12.

Component values used in the prototype were: R12=200 k$\Omega$, R33=100 k$\Omega$ and C13=22 pf. C13 must be made large enough, or some other compensation scheme used, to keep the feedback loop stable. V15 must be greater than the full modulation voltage required by the attenuator 30 (150 volts or more). The model PA42a high voltage amplifier was also used in this circuit.

For a normally-off attenuator, to maximize the transmission at zero input, V14 is set to zero and P14 is adjusted between positive and negative voltages V15 and V16 until the attenuation in the attenuator is zero, i.e., the transmission is maximized. A value of V14 which it is desired to correspond to zero transmission through the attenuator 30, e.g., five volts, is applied and P13 adjusted until that is obtained. Then, V14 is set between zero and five volts to control attenuation.

Normally-on reference attenuators operating at 0.88 µm were made to control both and normally-on and a normally-off main attenuators operating at 1.55 µm light. For two of them, typical dimensions and measured $V_\pi$ voltages are listed in the following table:

| normally | attenuator | λ(µm) | G (µm) | D (µm) | $V_\pi$ (V) |
|---|---|---|---|---|---|
| on | main | 1.55 | 260 | 600 | 235 |
|  | reference | 0.88 | 250 | 200 | 270 |
| off | main | 1.55 | 400 | 1,280 | 272 |
|  | reference | 0.88 | 385 | 540 | 279 |

It is desirable to make the gap in the main and reference the same subject to practical limits. The ideal optical lengths for the reference were calculated after measuring the main modulators and scaling using Equations (5) and (6). For reference purposes nominal values for PLZT are n=2.45 and R=2.53×10$^{-16}$ m/V$^2$ at 0.88 µm and n=2.3 and R=2.4×10$^{-16}$ m/V$^2$ at 1.55 µm.

Figure 20:
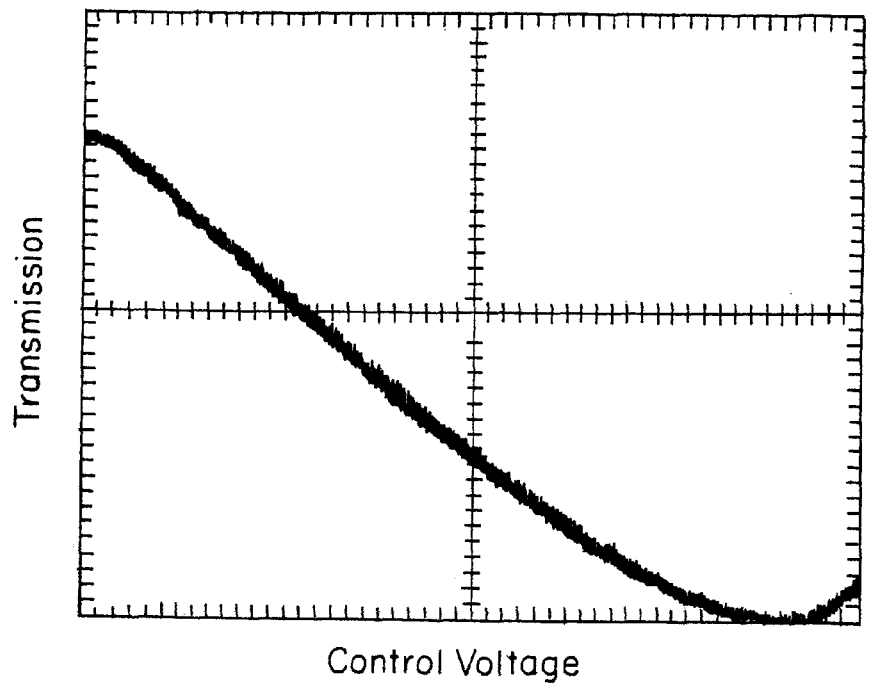
FIG. 20 shows the transmission versus input voltage for a normally-on attenuator in accordance with the present invention.

FIG. 20 shows the attenuation of the main attenuator as a function of input voltage, V14, for the normally-on attenuator. V13=0 volts at the origin and increases until attenuation is complete. There is some curvature as the attenuation approaches zero and the transmission rises again. This is because the feedback controls the transmission of the reference, Td, where Td=cos$^2$(V13/V$_\pi$d). Substituting V13 into a similar equation for the main attenuator, theoretically, Tm=cos$^2$[(V$_\pi$d)/V$_\pi$m)$^2$cos$^{-1}$(Td$^{1/2}$)]. When the half-wave voltages are equal, Tm=Td.

Figure 21:
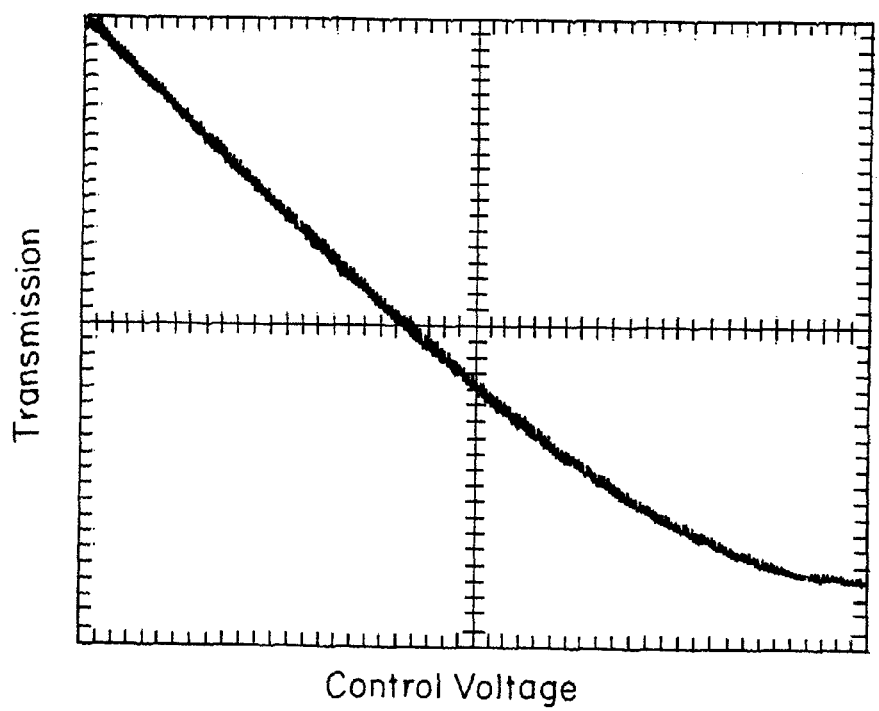
FIG. 21 shows the transmission versus input voltage for a normally-off attenuator in accordance with the present invention.

FIG. 21 shows the attenuation of a normally-off attenuator with potentiometers P13 and P14 modified to compare with the normally-on attenuator. Here, V13=0 volts when the transmission is zero and increases to the left.

Both figures show a trace from 0 to 100% and back. Hysteresis was smaller than the noise in the scope trace. Without any compensation, hysteresis is quite marked.

The temperature stability was measured by heating and cooling from 25° C. to 75° C. over a period of one hour. The attenuation was set to 1 dB (to make sure the circuits were active) and the change in attenuation measured. The variation in attenuation was 0.15 dB for the normally-off modulator and 0.05 dB for the normally-on modulator. When they were set to 20 dB of attenuation, the normally-off attenuator varied by 0.6 dB and the normally-on one by 1.5 dB. The latter represents a 30% change, but that is only 0.3% of the input.

It should be noted that, it is quite important that the electro-optic plates are as nearly matched as possible. They can be from the same ceramic plate and be cut and polished in the same way. Also, it was noted that the use of larger beam diameters in the main modulator produced better results. This can be related to the use of large beam diameters in the reference modulator. The use of different wavelengths, 0.88 µm and 1.33 µm, did not seem to make a difference. This may not be true for all electro-optic materials, however.

In the case of electro-optic phase retarders which use linear effects, similar principles apply with modifications of Equations (5) and (6). If however, as in liquid crystal-based phase retarders, the fields are parallel to the light beam, then the gap between electrodes, G, and the optical length, D, are the same. Then, the optical length of the reference attenuator can not be changed without changing the electric field. However, the voltage applied to the reference attenuator can be made slightly less than that applied to the main attenuator in order not to reach the double valued region of the reference.

PZT, instead of PLZT, is used for its piezoelectric effect in which the field induced strain has a quadratic dependence. It also has a quadratic electro-optic effect, but is not used in optical applications because of poor optical transmission. However, it is not opaque. Thus, if a PZT mechanical actuator replaces the main attenuator and a PZT electro-optic plate replaces the plate in the reference attenuator, the voltage on the actuator can be controlled in the same way. If actuator movement is calibrated against the input voltage that controls the optical transmission, then the mechanical drift with temperature can be compensated. This application is not limited to PZT, but only to materials which have both a piezoelectric effect and a practical electro-optic effect.

Figure 22:
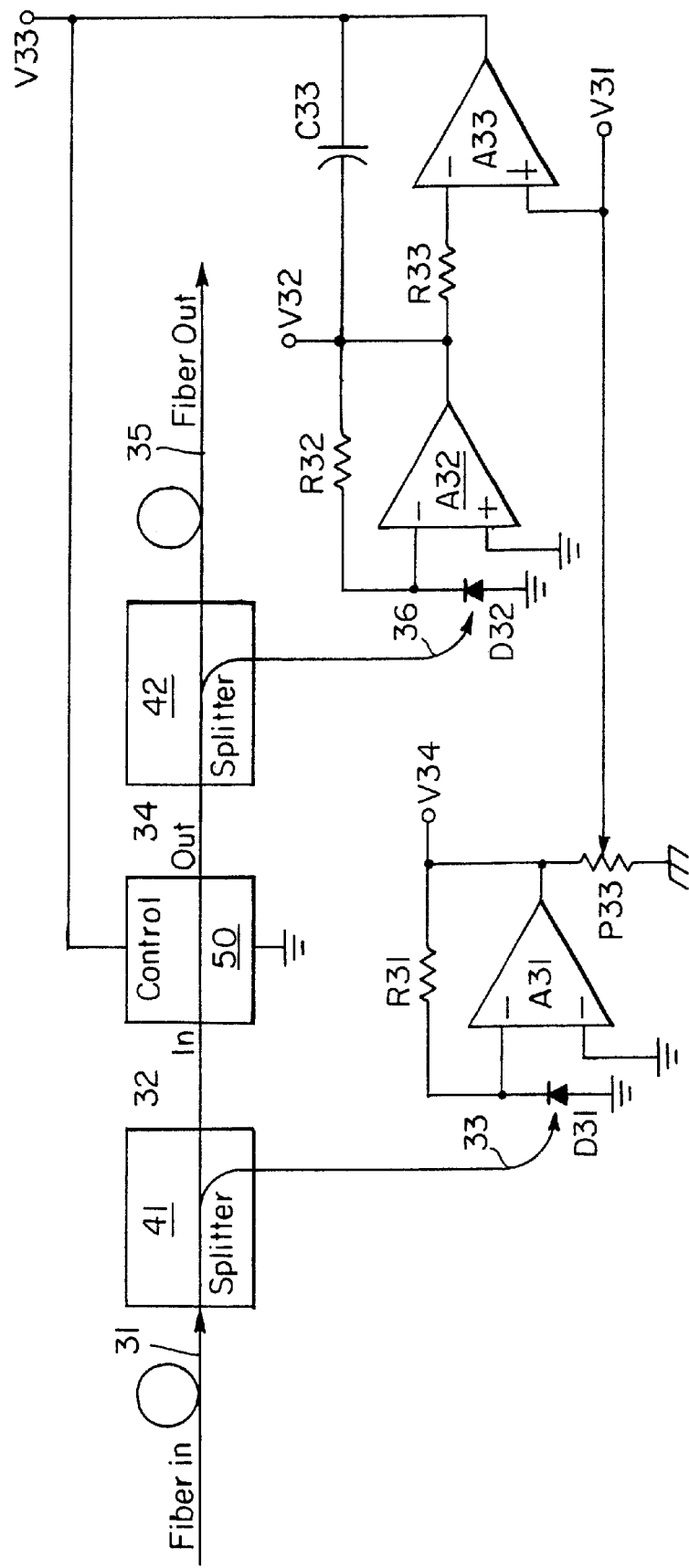
FIG. 22 shows another preferred embodiment in accordance with the present invention using optical splitters.

Another embodiment of the invention that is not limited to a particular type of attenuator is illustrated in FIG. 22. A light beam 31 impinges on an optical splitter 41 that passes most of the light as the beam 32, but diverts a fixed fraction, F31, as light beam 33. The light from the beam 32 passes through a voltage controllable attenuator 50 that attenuates the light that emerges as beam 34 that, in turn, impinges on a second optical splitter 42. Similarly to the first splitter 41, most of the light passes to an output beam 35, but a fraction, F32, is diverted as beam 36.

The splitters 41 and 42 can be made from a dichroic mirror or, alternatively, partially reflecting metal films on transparent substrates. If the light beams are carried by fiber optic cables, commercially available couplers can be used. If the light beams are carried by surface wave guides, tapping off a small fraction to divert the fraction into an adjacent waveguide can be used and the output coupled out via fiber-optic cables.

Light from the first optical splitter 41 is made to impinge on a light sensor such as a photodiode D31. This generates a photocurrent, I1, proportional to the light amplitude that is converted into a voltage by the transimpedance amplifier A31. The voltage is simply V1=I1·R31. In terms on input power, $P_i$, this is V34=k31·F31·Pi·R31 where k31 is the conversion factor (amps/watt) for the photodiode D31. Similarly, photodiode D32 converts the light from cable 36 into a current that, due to amplifier A32 and resistor R32 produces a voltage, V32, given by V32=k32·F32·Po·R32 where $P_o$ is the output power.

A potentiometer P33 provides an attenuated value of V34, namely, V31=αV34, where α is the attenuation of P33. V31 is connected to the non-inverting input of amplifier A33, V32 is connected to the inverting input and the output, V33, is connected to the control port of the optical attenuator 51. Assuming A33 has sufficient gain, it will produce a control voltage, V33, sufficient to make V32=V31. As illustrated, the optical attenuator 51 is normally non-attenuating and increasingly negative control voltages increase the attenuation. The overall attenuation, $P_o/P_i$, is given by α(k31·F31·R31)/(k32·F32·R32). If R31 or R32 is adjusted so that k31·F31·R31=k32·F32·R32, then $P_o$=α$P_i$. P33 may be omitted and R31 used alone to control the attenuation. However, this may result in an attempted setting requiring $P_o$ to be greater than $P_i$ which is not possible. As in the previous embodiment, C33 is increased until the feedback loop is stable. P33 may be replaced by an analog multiplier to obtain a voltage controlled input.

In this embodiment, the precision of the control also depends on matching the light sensors D31 and D32 with respect to temperature variations.

In another embodiment, an absolute transmission controller may be obtained by leaving out the first beam splitter, 41, diode D31, and amplifier A31 and associated circuitry and using V31 to control the absolute intensity. In this case, D32 and associated circuitry must be stable on an absolute basis.

Figure 23A:
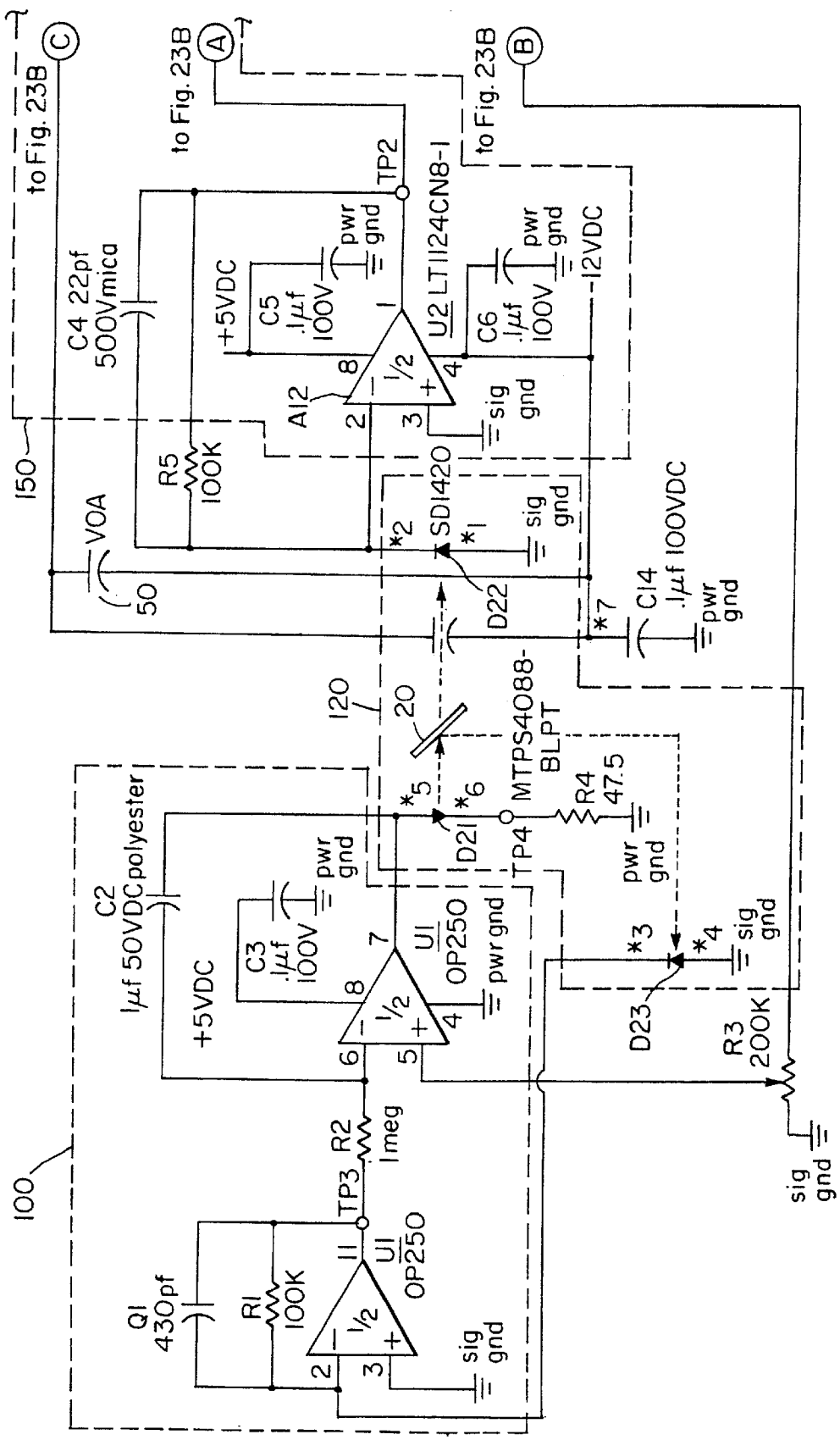
FIGS. 23A and B show a detailed embodiment of the variable attenuator with a compensator in accordance with the present invention.
Figure 23B:
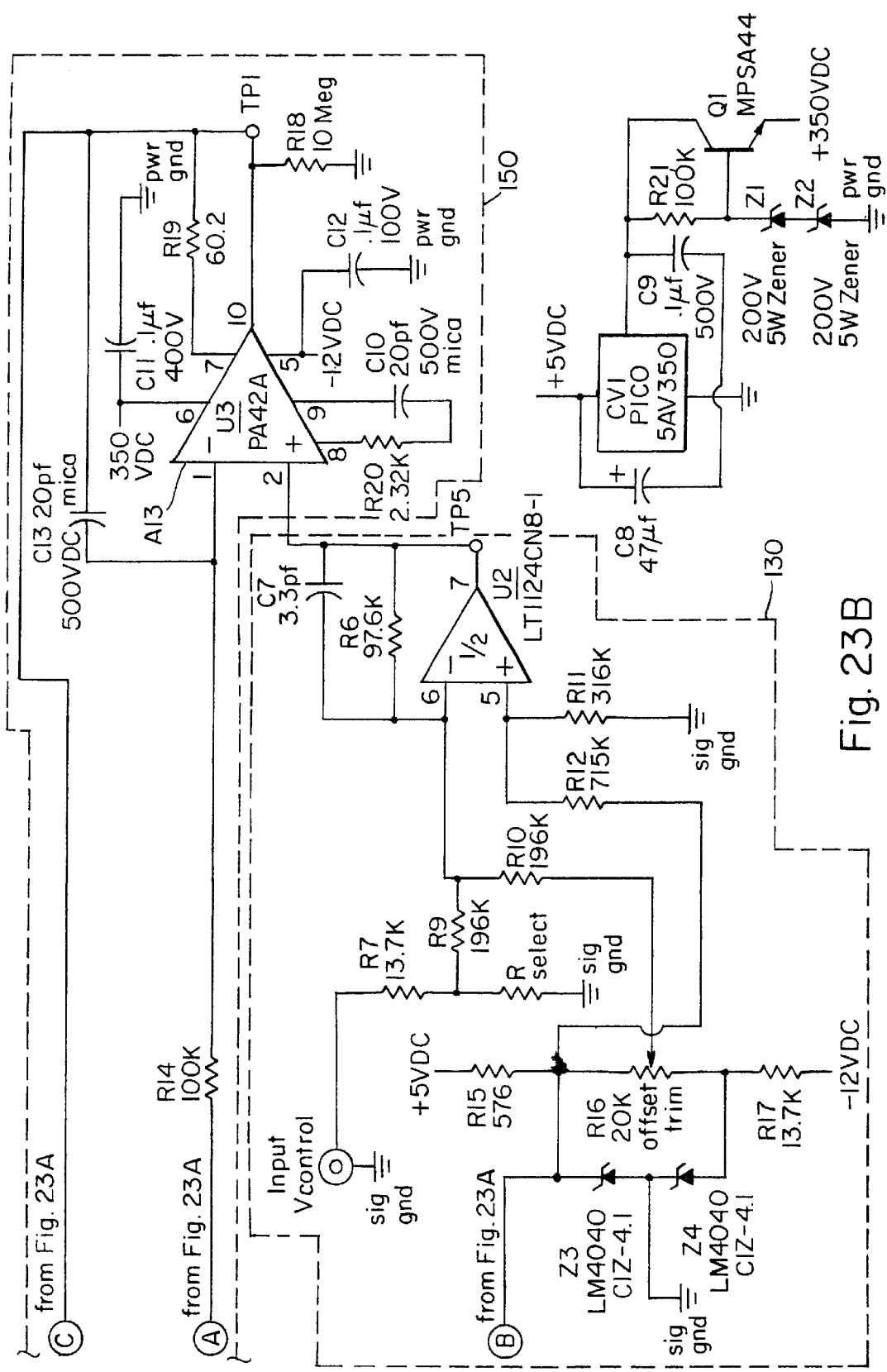

Referring to FIGS. 23A and B, further details of a variable attenuator with a compensator system in accordance with the present invention are provided. This embodiment illustrates the principles of operation of a variable attenuator (VOA) 50 in parallel with a reference attenuator (VOA')120. The circuitry for this embodiment is illustrated by the schematics, FIGS. 23A and B. The stability of the device depends on the stability of the reference light source. The reference attenuator 120 was modified to include a partially reflecting mirror 20 that reflects a small portion of the light from the source D21 to a second photodiode light detector D23. A light emitting diode driver represented by block 100 is a part of a feedback loop to keep the output from D21 a constant.

The light source D21 is an 0.88 $\mu$m GaAs light emitting diode. The photo detector D22 and D23 are silicon photodiodes. An offset voltage compensator block 130 is used to adjust for various small voltage offsets in the compensator circuit. A high voltage driver circuit block 150 is coupled to the compensator 120 and to the VOA 50 such that the same high voltage and same electric field distribution is present in both VOA and compensator. An environmental change to both compensator and VOA will then cause the same polarization change and produce a change in optical transmission through the compensator. Feedback from the electrical circuit will then force the optical transmission through the compensator and through the VOA to return to its intended value, as described earlier.

Figure 24:
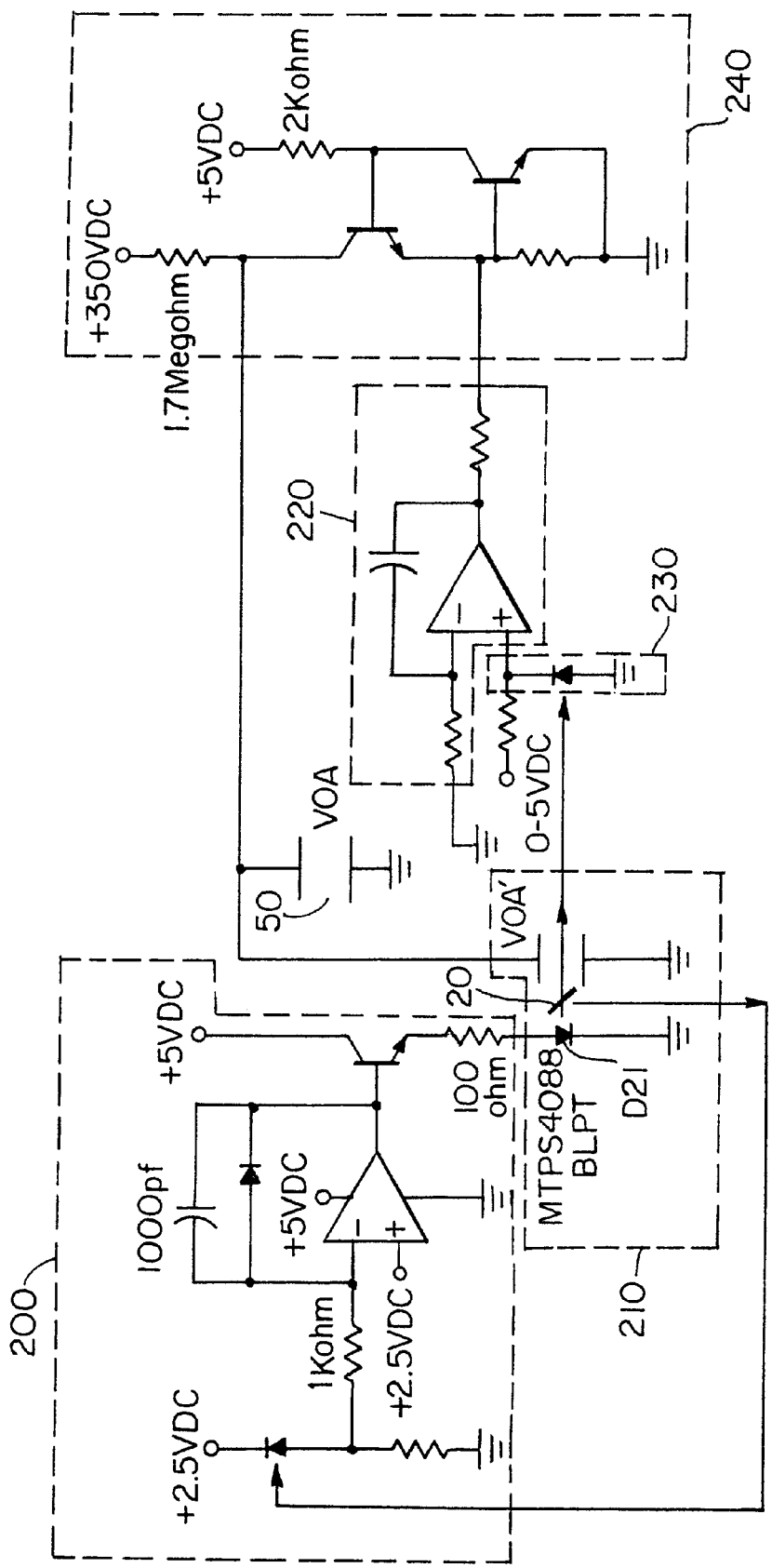
FIG. 24 shows an embodiment of the variable attenuator with a compensator in accordance with the present invention.

Referring to FIG. 24, another embodiment of a variable attenuator with a compensator system in accordance with the present invention is provided. The reference attenuator 210 was modified to include a partially reflecting mirror 20 that reflects a small portion of light from the light source D21 to a feedback loop which includes the light emitting diode driver circuit block 200. The feedback loop keeps the output from D21 constant.

The light source D21 is an 0.88 $\mu$m GaAs light emitting diode. A transimpedance amplifier 220 converts the photocurrent from the detector 230 into a voltage. A high voltage driver 240 is coupled to the transimpedance amplifier 220.

Referring to FIGS. 25A and 25B, another embodiment of a variable attenuator is shown in which the output power of the device is tapped and a feedback circuit maintains the output level constant. In this mode of power control, the attenuation may vary but the output power level is kept constant. This embodiment, having the output tap, is useful as a power limiter.

The embodiment comprises a transimpedance amplifier 300 which is coupled to a high voltage driver 310. The transimpedance amplifier 300 converts the photocurrent from the detector 320 (LED) into a voltage. The variable attenuator 50 is coupled to the high voltage driver 310. The light beam from the attenuator impinges on an optical splitter 20 which diverts a fixed fraction of light to the detector 320 to form a feedback loop while most of the light passes to an output beam.

Figure 26:
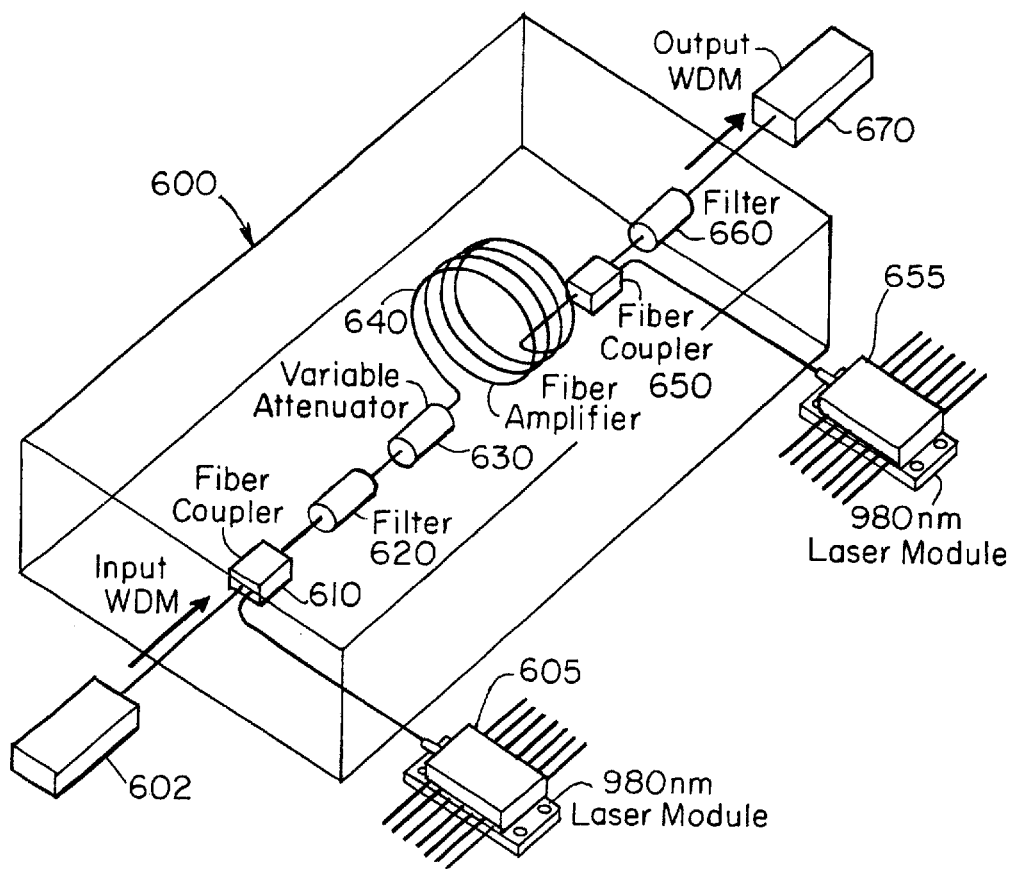
FIG. 26 illustrates the utility of the present invention with a fiber amplifier in a DWDM system.

Referring to FIG. 26, a wavelength division multiplexing (WDM) fiber-optic telecommunications system using a preferred embodiment of the present invention is shown. The variable attenuator of the present invention attenuates the power into the fiber amplifier. A fiber-optic telecommunications system 600 includes input wavelength division multiplexers (WDM) 602, a laser module 605, fiber coupler 610, a filter 620, the variable attenuator 630 of the present invention, a fiber amplifier 640 coupled to a fiber coupler 650, a laser module 655, a filter 660, and an output WDM. The output of the laser module 605 is coupled with the input WDM in the fiber coupler 610. After filtering the optical signal is attenuated in the variable attenuator 630 before forming an input into the fiber amplifier. Once amplified, the signals are coupled with the output of the laser module 655 and filtered by filter 660. The signals provide a wavelength division multiplexed optical signal carried to remote subscriber locations.

Figure 27:
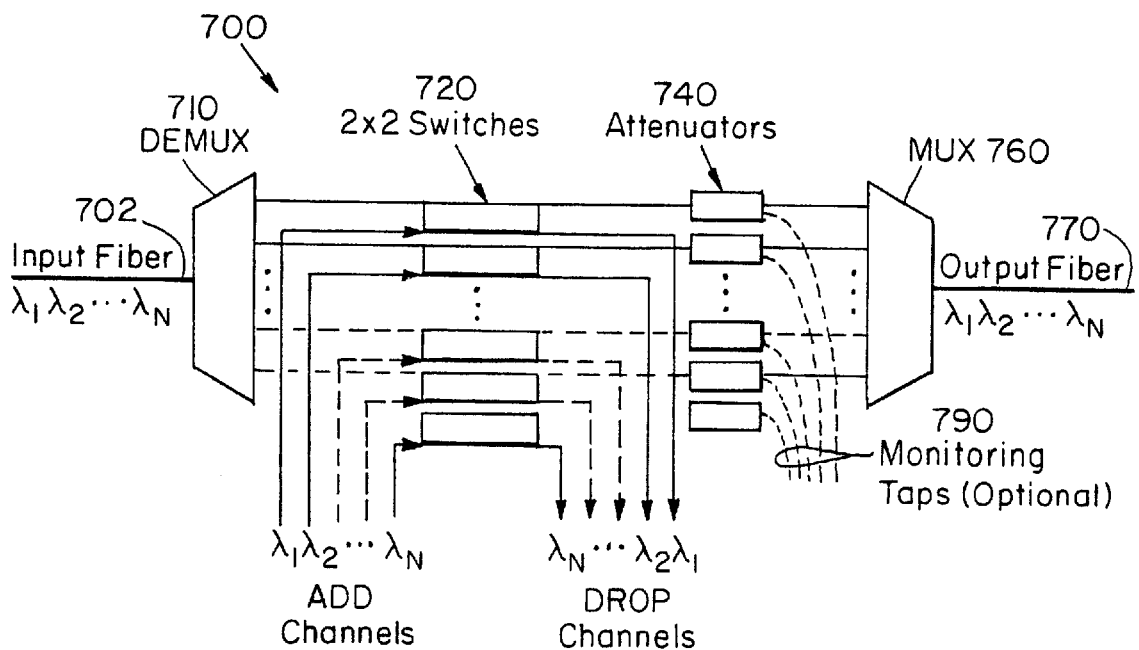
FIG. 27 illustrates the utility of the present invention for power balancing in DWDM systems.

Referring to FIG. 27, the variable attenuator of the present invention is illustrated in DWDM systems. The variable attenuator balances power in the channels having different wavelengths. A dense WDM, system which operates on densely spaced wavelengths includes an input fiber 702 carrying optical signals of different wavelengths which form the input into a demultiplexer 710 which demultiplexes the combined input optical signal. The demultiplexed optical signals and added channels $\lambda_1$–$\lambda_N$ then form the input to separate switches 720. The output of the switches then form the input to the attenuators 740 of the present invention. The attenuators are used for power balancing in the DWDM system. By this approach of modulating separate wavelengths, a subscriber location can be provided with multiple services from a single laser source from a single fiber. The output signals from the attenuators 740 are then multiplexed in multiplexer 760 and outputted on an optical fiber 770. If required the output of the attenuators can be tapped using the monitoring taps 790.

While the invention has been described in terms of attenuators and actuators, other types of devices can be produced. For example, a power leveler that controls the log of the intensity could be made by converting the output of the light sensors, D22, into a logarithmic representation. As another example, the main attenuator could be replaced by a simple phase retarder controlled by the reference modulator. The amount of phase shift in the retarder could be calibrated against transmission in the reference modulator and thereafter controlled. In this application, since transmission versus phase is non-linear, use of analog-to-digital and digital-to-analog converters in conjunction with a digital processor would be useful. The latter approach would also be useful in the piezoelectric actuator embodiment.

Besides PLZT and PZT, without being an exhaustive list the following materials may be used: $Pb(Zr,Ti)O_3$, $Pb(Mg, Nb)O_3$, and a solid solution of $Pb(Mg,Nb)O_3$ and $PbTaO_3$. Further, the embodiment of the present invention can be used in an optical fiber communication system, in particular for dense wavelength division multiplexing (DWDM). The embodiments of the present invention can attenuate the power input to optical fiber amplifiers. In addition, in another DWDM application, the embodiments of the present invention can balance power in different wavelength channels.

While the preferred embodiments have been sufficiently described to enable one skilled in the art to make and use them, it should be appreciated that other obvious alternatives, modifications, or equivalents will be apparent to those in the field of electro-optics. In particular, even without applying a voltage, a strong external electric field will affect the phase retarder and thus the device can be used as an electric field sensor.

What is claimed is:

1. A variable optical attenuator modulator comprising:
   an input optical fiber;
   a polarization separator that separates incident light from the input optical fiber into two polarization components along separate paths within the modulator;
   a solid-state electro-optic phase retarder that receives the two polarization components from the polarization separator, the retarder having electrodes that provide an electric field across the retarder, said electric field in said phase retarder producing relative phase retardation with respect to the two polarization components, said retarder comprising a crystalline ceramic material;

a voltage control circuit that is connected to the electrodes such that an adjustable electric field can be applied across the retarder;

a polarization recombiner that combines the polarization components from the retarder to form a modulated optical signal; and an output fiber optically coupled to the recombiner and that receives the modulated optical signal.

2. The attenuator of claim 1 wherein said retarder is selected from a class of ferroelectric complex oxide materials characterized by having a Curie temperature of less than about 600° C.

3. The attenuator of claim 1 wherein said separator and recombiner comprise plates of birefringent material having c-axes oriented to transversely displace the direction of travel of the two polarization rays with respect to each other.

4. The attenuator of claim 1 wherein said separator and recombiner comprise wedges of birefringent material having a c-axis transverse to the light beam and having a face oriented at an angle to the direction of travel of the light beam so that one polarization ray is deflected at an angle with respect to the other.

5. The attenuator of claim 1 further comprising a fixed 90° polarization direction rotator disposed between said polarization separator and said polarization recombiner to provide a normally-on type modulator.

6. The attenuator of claim 5 wherein said fixed 90° polarization direction rotator is comprised of a plate of birefringent material having a c-axis oriented perpendicular to the direction of travel of light and at 45°+N×90° (N an integer) to said separation plane.

7. The attenuator of claim 5 wherein said fixed 90° polarization direction rotator is comprised of optically active material having an optical path length that provides 90° of rotation.

8. The attenuator of claim 1 wherein said retarder comprises PLZT.

9. The attenuator of claim 1 further comprising:

a first fixed 45° polarizer direction rotator disposed between said separator and phase retarder;

a second fixed 45° polarizer direction rotator disposed between said phase retarder and said recombiner, so that said phase retarder electrodes provide a transverse electric field at 90° to said separator plane.

10. The attenuator of claim 9 wherein said first and second fixed 45° polarizer direction rotators comprise half-wave plates with their c-axes oriented perpendicular to the direction of the optical paths and at 22.5°+N×45° (N an integer) with respect to said separator plane.

11. The attenuator of claim 1 such that the modulator operates at a voltage of 500 volts or less.

12. A light intensity modulator comprising:

a polarization separator receiving light at an input area and that separates the light into two polarization components that transit the modulator along separate paths;

a PLZT phase retarder having electrodes that provide a transverse electric field that produces relative phase retardation with respect to components of each of the two polarization components produced by the polarization separator; and a polarization recombiner from said polarization separator and receiving the light at an output area with an orientation with respect to said polarization separator; and a reflector oriented to direct light transiting said separator and said retarder in the forward direction back through said retarder and said recombiner in the reverse direction to the output area.

13. The modulator of claim 12 wherein said retarder is selected from a class of ferroelectric complex oxide materials characterized by having a Curie temperature of less than about 600° C.

14. The modulator of claim 12 wherein said separator and recombiner comprise plates of birefringent material having c-axes oriented to transversely displace the direction of travel of the two polarization rays with respect to each other.

15. The modulator of claim 12 wherein said separator and recombiner comprise wedges of birefringent material having a c-axis perpendicular to the direction of travel and having a face oriented at an angle to the direction of travel of the light beam so that one polarization ray is deflected at an angle with respect to the other.

16. The modulator of claim 12 further comprising a linear-to-circular polarizer disposed between said separator and transversely displaced recombiner and said reflector whereby a normally-off type modulator is converted to a normally-on type modulator and vice versa so that low polarization mode dispersion can be obtained for either type modulator.

17. The modulator of claim 16 wherein said linear-to-circular polarizer is comprised of a quarter-wave plate with its c-axis oriented perpendicular to the direction of travel and at 45°+N×90° (N an integer) with respect to said separator plane.

18. The modulator of claim 12 further comprising a fixed 45° polarization direction rotator disposed between said separator and transversely displaced recombiner and said reflector so that said phase retarder electrodes may be arranged to provide a transverse electric field at 90° to said separator plane so that the gap between electrodes is minimized.

19. The modulator of claim 18 wherein said fixed 45° polarization direction rotator is comprised of a half-wave plate with its c-axis oriented perpendicular to the direction of travel and at an angle of 22.5°+N×45° (N an integer) with respect to said separator plane.

20. The modulator of claim 18 wherein said fixed 90° polarization direction rotator is comprised of optically active materials having a length selected to provide 90° of rotation.

21. The modulator of claim 12 wherein said separator and said combiner are made from a single slab of material so that manufacturing assembly and alignment costs are reduced.

22. The modulator of claim 12 wherein said reflector comprises a GRIN lens having a mirror on an end opposite the input and output areas.

23. The modulator of claim 12 further comprising a block of material having V-grooves at a precise spacing such that alignment with optical fibers is made easier.

24. A method of modulating an optical signal comprising:

coupling light from an input optical fiber to a polarization separator to separate the light into a plurality of polarization components;

providing a solid state electro-optic phase retarder including a crystalline ceramic material;

applying an electric field in a direction across an optical path of the polarization components with the solid state electro-optic phase retarder to provide relative phase retardation between the components; and combining the polarization components to form a modulated output signal.

25. The method of claim 24 further comprising coupling the output signal to an optical fiber.

26. The method of claim 24 further comprising providing a pair of electrodes parallel to the optical path.

27. The method of claim 24 further comprising reflecting light from a first optical path through the retarder along a second optical path.

28. The method of claim 24 further comprising providing a phase retarder including a PLZT material.

29. The method of claim 24 further comprising providing a separator formed with a birefringent material.

30. The method of claim 24 further comprising attenuating light transiting the modulator.

31. The method of claim 24 switching the modulator between on and off states.

32. The method of claim 24 further comprising coupling light between the fiber and the separator with a lens.

33. The method of claim 32 wherein the lens comprises a graded index lens.

34. The method of claim 24 further comprising applying a voltage across the retarder of 500 Volts or less.

35. The method of claim 24 wherein the modulated signal is independent of the polarization of light incident on the separator.

36. The method of claim 24 further comprising providing a pair of electrodes on the retarder applying an electric field orthogonal to the optical path.

37. The method of claim 24 further comprising providing an optical combiner formed with a birefringent material.

* * * * *